June 14, 1955 R. P. BOYER, JR 2,710,893

AUTOMATIC TELEPHONE SYSTEM AND TRANSLATOR THEREFOR

Filed March 27, 1951 21 Sheets-Sheet 1

INVENTOR:
RICHARD P. BOYER JR
BY John J. Bellamy
ATTORNEY

June 14, 1955 R. P. BOYER, JR 2,710,893

AUTOMATIC TELEPHONE SYSTEM AND TRANSLATOR THEREFOR

Filed March 27, 1951 21 Sheets-Sheet 2

INVENTOR:
RICHARD P. BOYER JR.
BY John I. Bellamy
ATTORNEY

AUTOMATIC TELEPHONE SYSTEM AND TRANSLATOR THEREFOR

INVENTOR:
RICHARD P. BOYER JR.
BY John J. Bellamy
ATTORNEY

AUTOMATIC TELEPHONE SYSTEM AND TRANSLATOR THEREFOR

Filed March 27, 1951 21 Sheets-Sheet 4

INVENTOR:
RICHARD P. BOYER JR.
BY John J. Bellamy
ATTORNEY

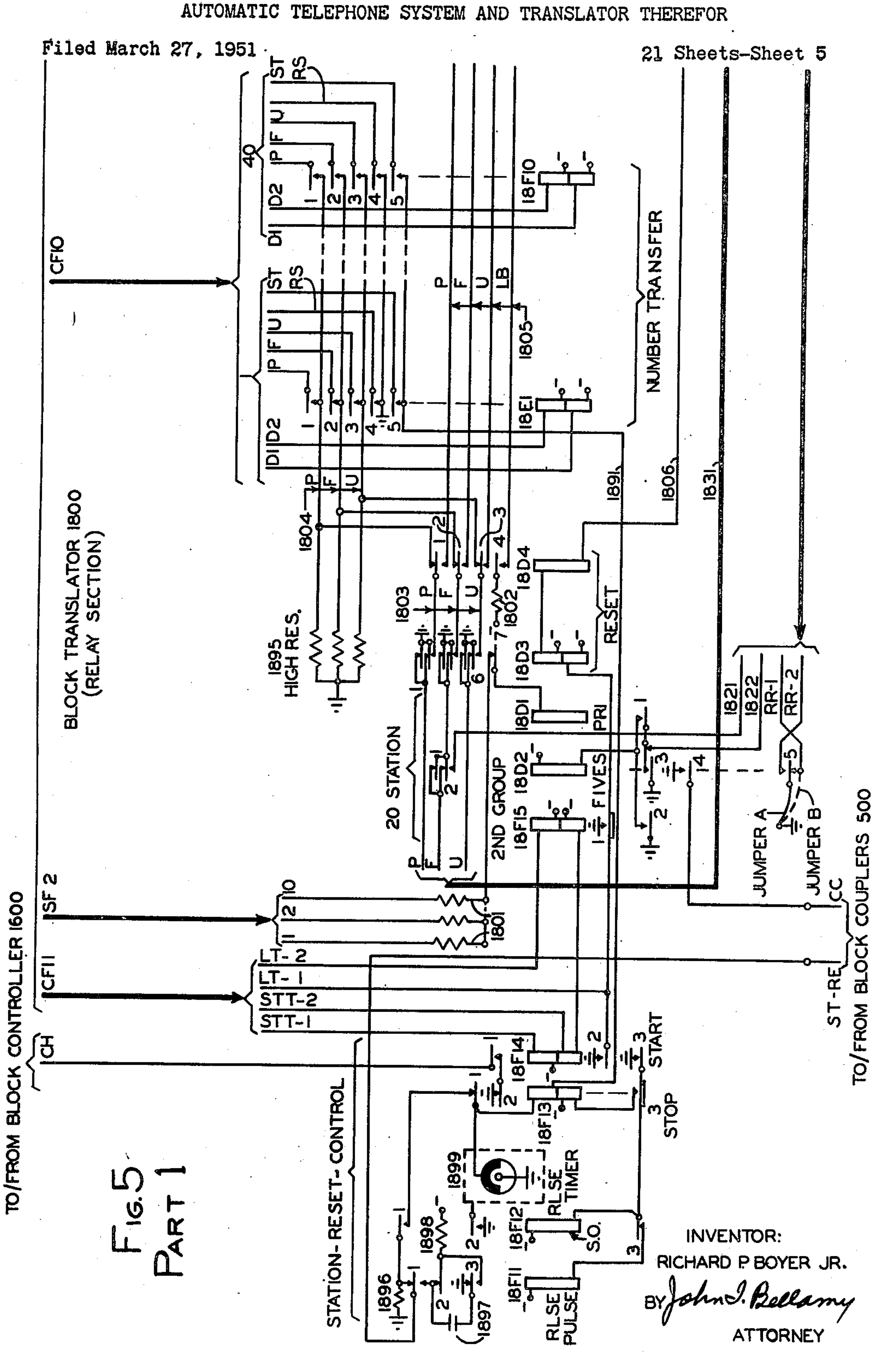
FIG. 5 PART 1
INVENTOR:
RICHARD P BOYER JR.
BY John I. Bellamy
ATTORNEY AUTOMATIC TELEPHONE SYSTEM AND TRANSLATOR THEREFOR
Filed March 27, 1951 21 Sheets-Sheet 6
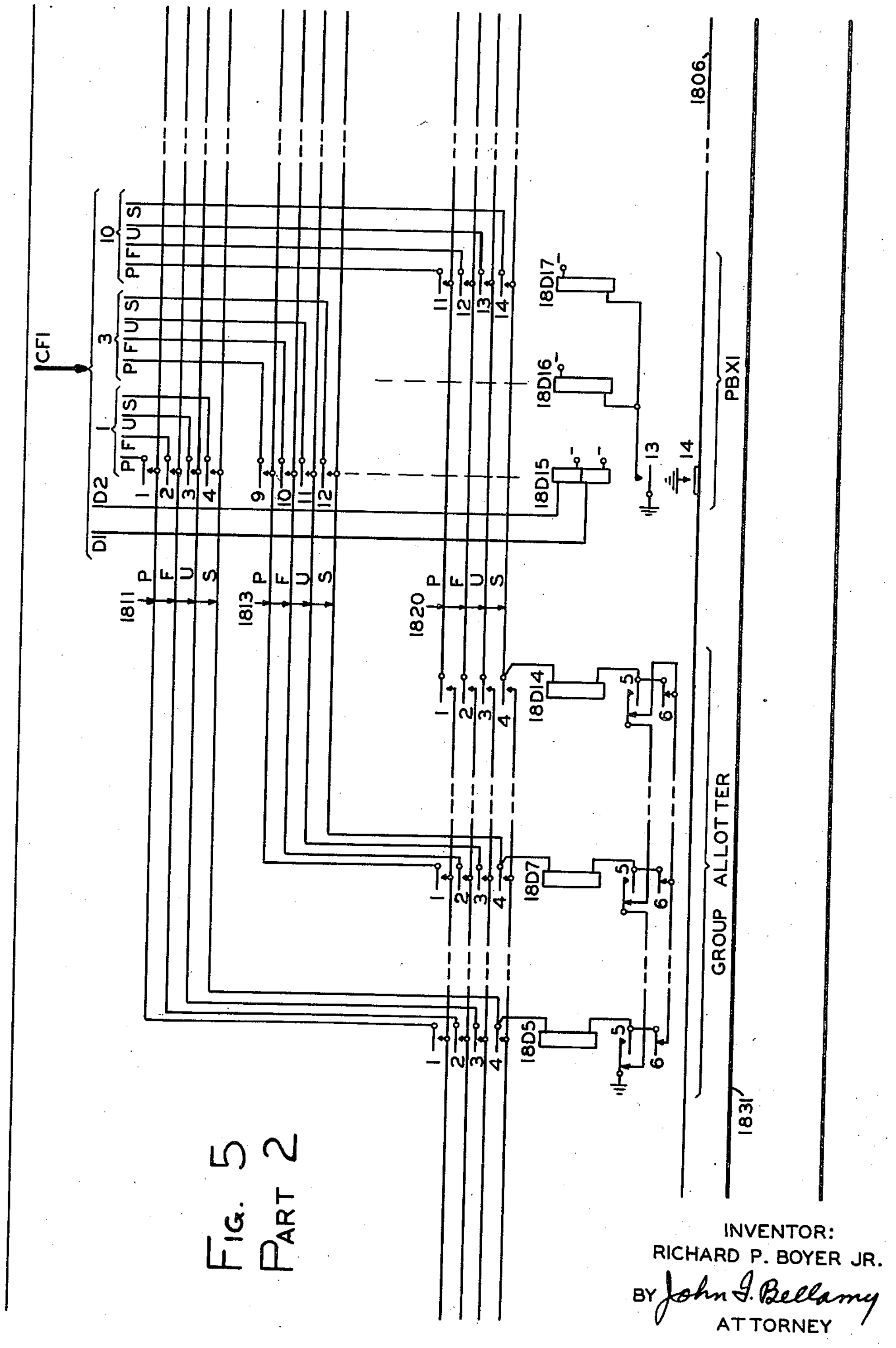
FIG. 5 PART 2
INVENTOR:
RICHARD P. BOYER JR.
BY John J. Bellamy
ATTORNEY

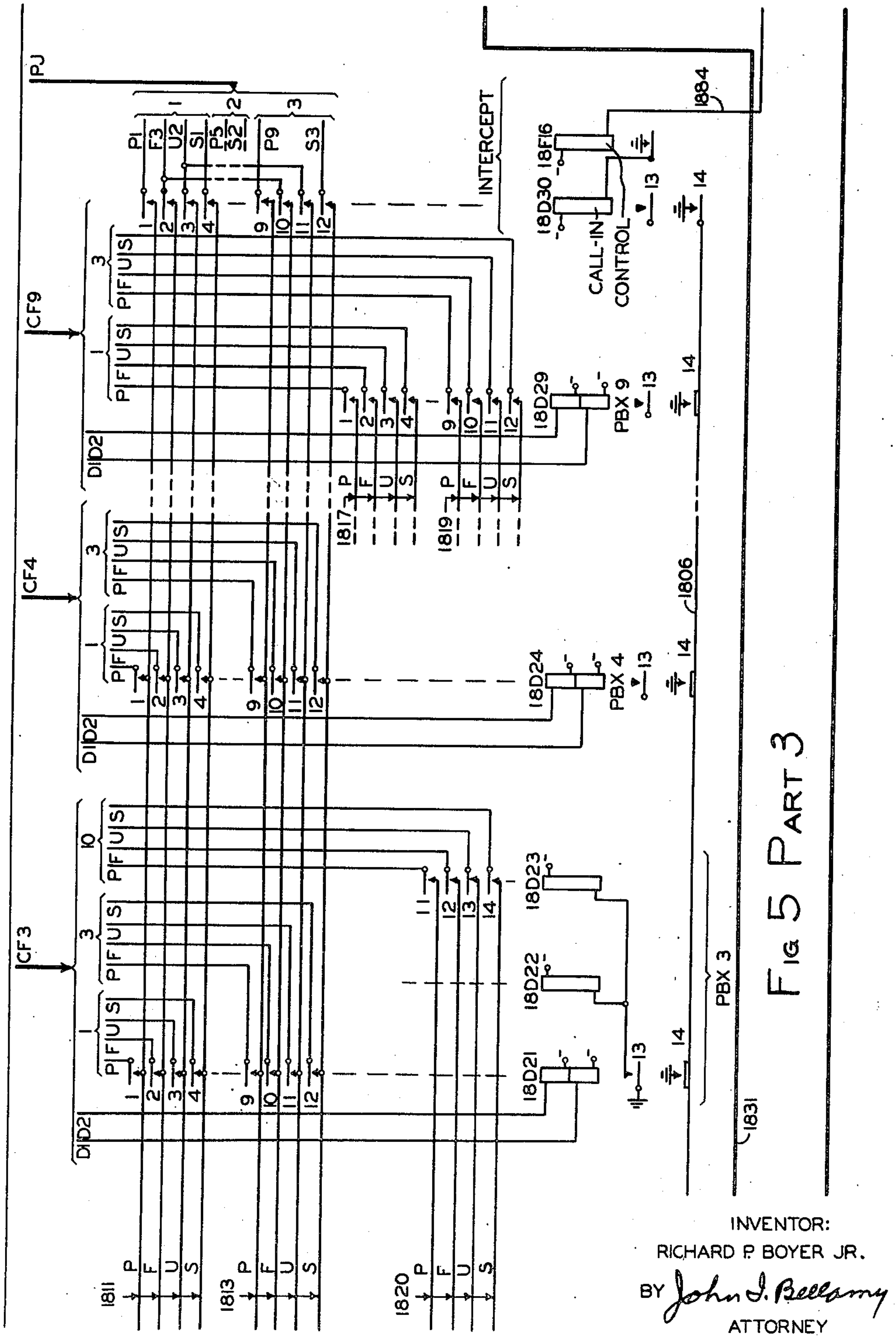
FIG 5 PART 3
INVENTOR:
RICHARD P. BOYER JR.
BY John I. Bellamy
ATTORNEY June 14, 1955 R. P. BOYER, JR 2,710,893
AUTOMATIC TELEPHONE SYSTEM AND TRANSLATOR THEREFOR
Filed March 27, 1951 21 Sheets-Sheet 8
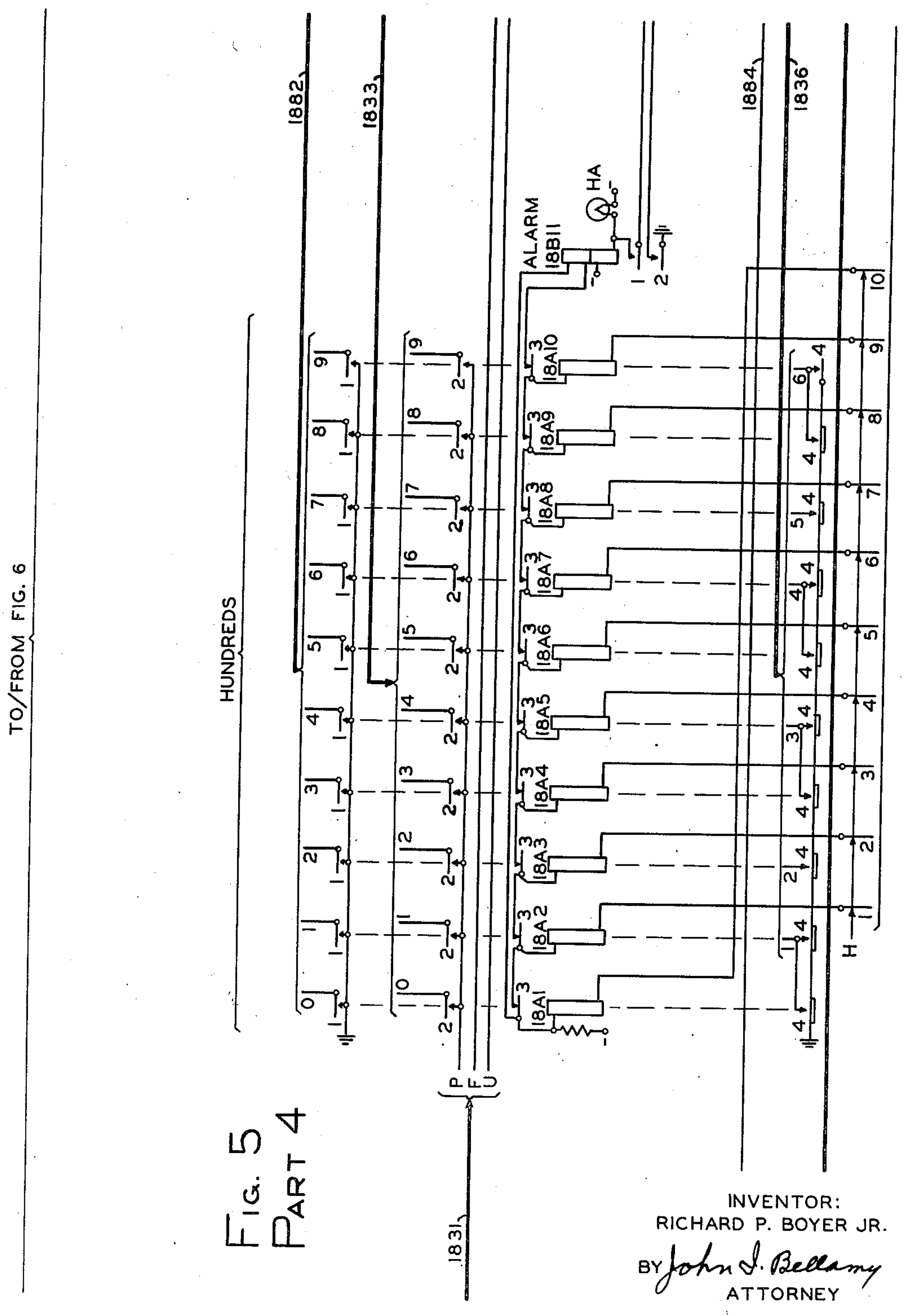
FIG. 5 PART 4
INVENTOR:
RICHARD P. BOYER JR.
BY John J. Bellamy
ATTORNEY AUTOMATIC TELEPHONE SYSTEM AND TRANSLATOR THEREFOR
Filed March 27, 1951 21 Sheets-Sheet 9
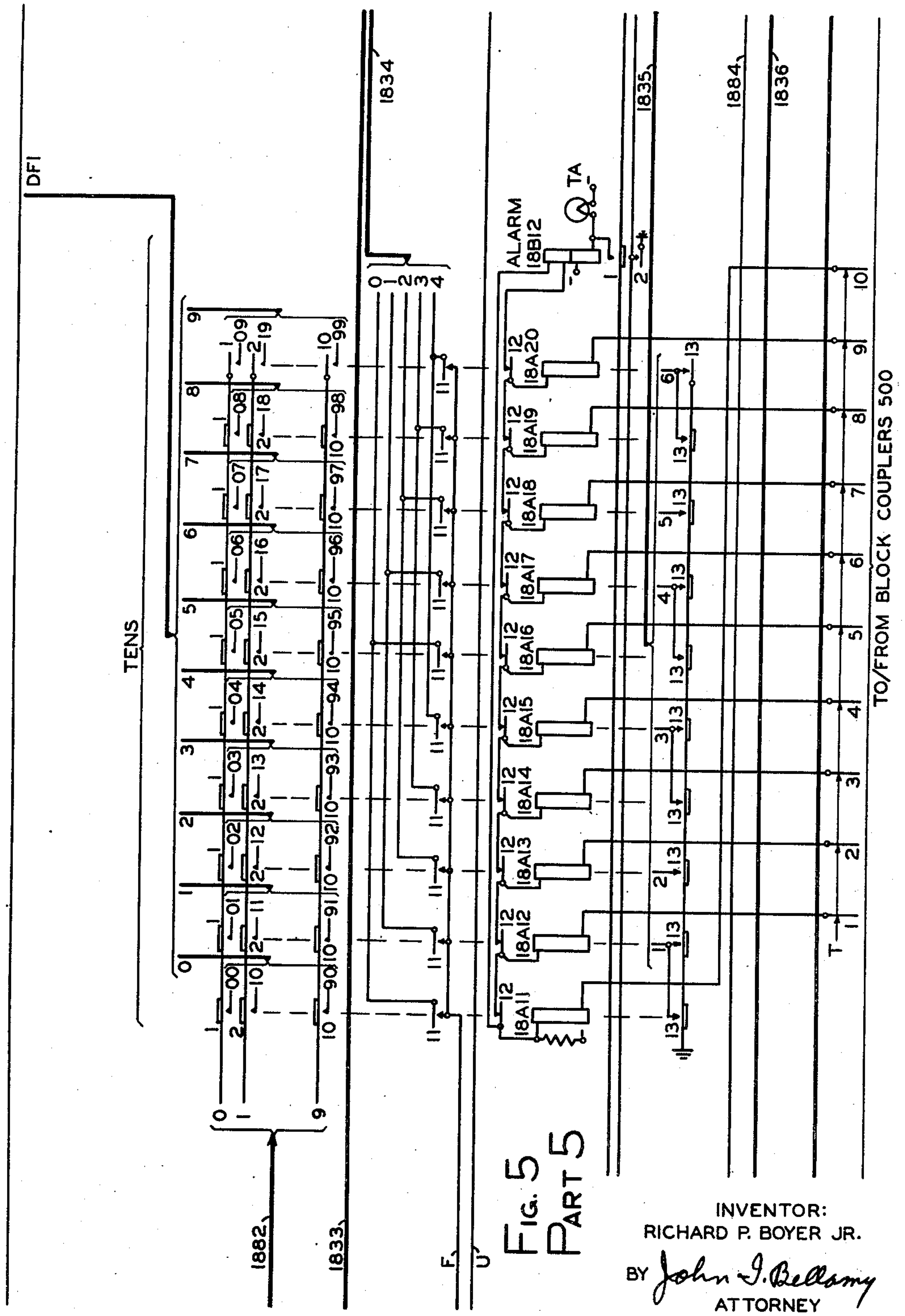
FIG. 5 PART 5
INVENTOR:
RICHARD P. BOYER JR.
BY John J. Bellamy
ATTORNEY June 14, 1955 R. P. BOYER, JR 2,710,893
AUTOMATIC TELEPHONE SYSTEM AND TRANSLATOR THEREFOR
Filed March 27, 1951 21 Sheets-Sheet 10
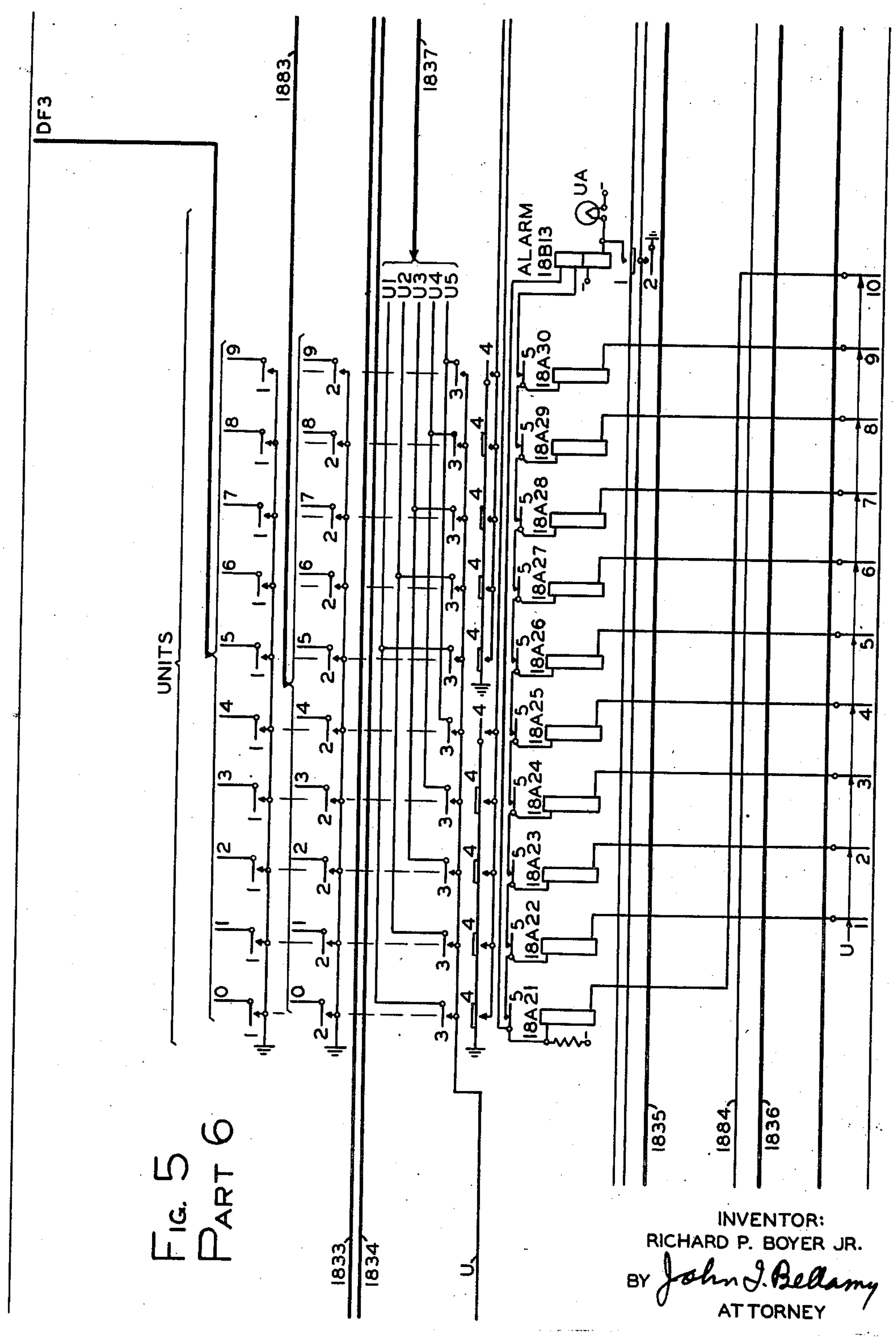
FIG. 5 PART 6
INVENTOR:
RICHARD P. BOYER JR.
BY John J. Bellamy
ATTORNEY AUTOMATIC TELEPHONE SYSTEM AND TRANSLATOR THEREFOR
Filed March 27, 1951 
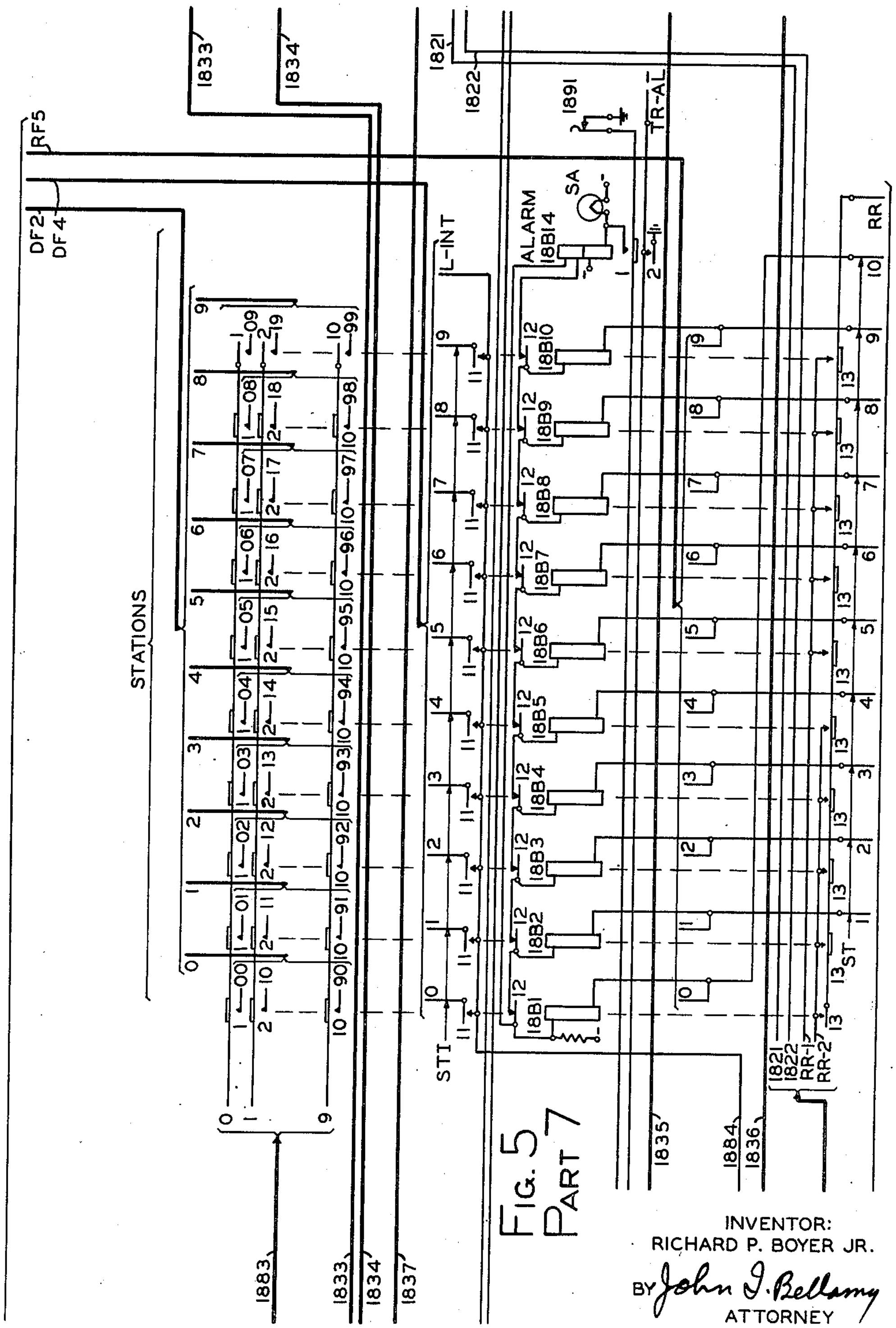
FIG. 5 PART 7
INVENTOR:
RICHARD P. BOYER JR.
BY John J. Bellamy
ATTORNEY AUTOMATIC TELEPHONE SYSTEM AND TRANSLATOR THEREFOR
Filed March 27, 1951 21 Sheets-Sheet 12
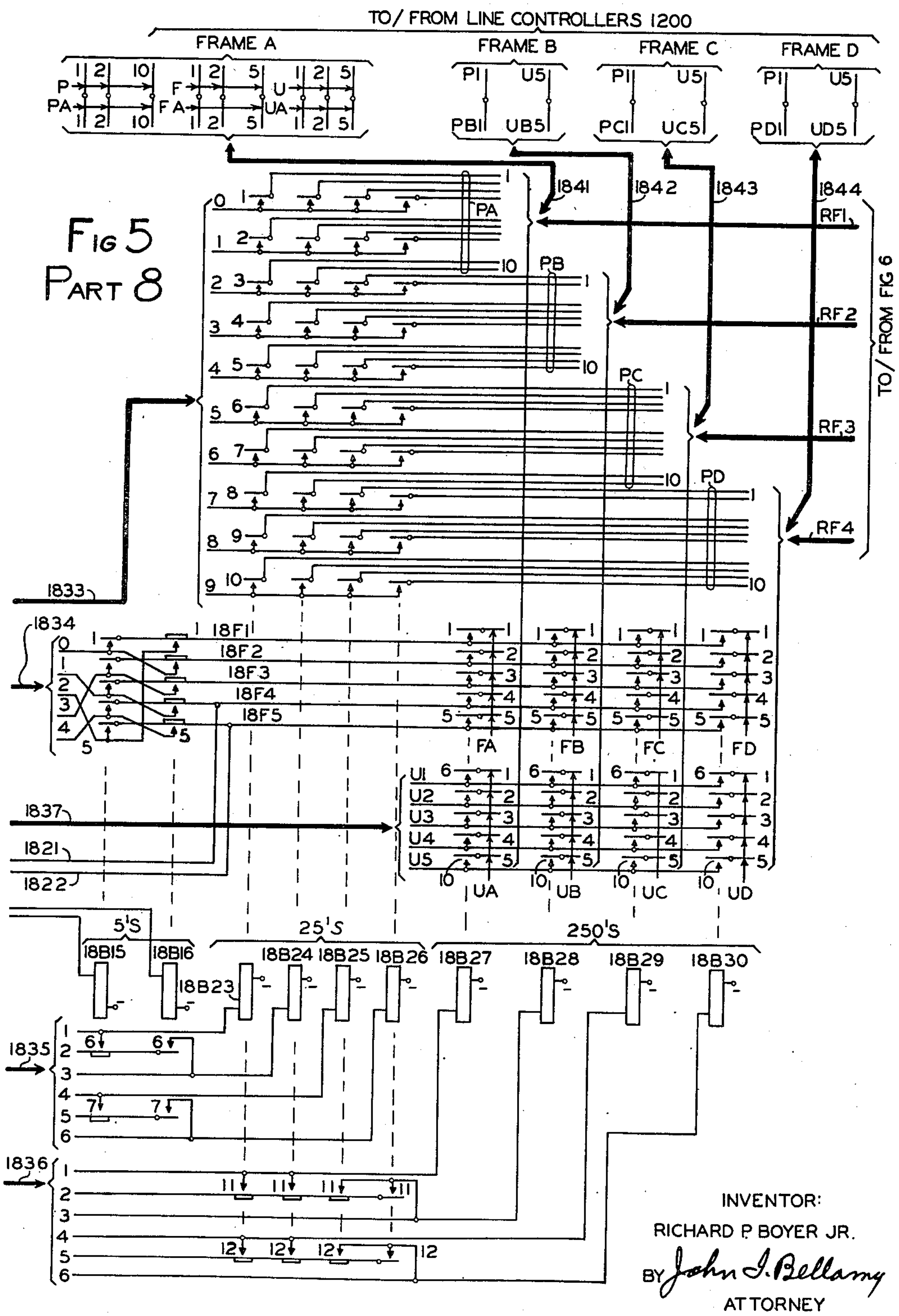
FIG 5 PART 8
INVENTOR:
RICHARD P. BOYER JR.
BY John J. Bellamy
ATTORNEY AUTOMATIC TELEPHONE SYSTEM AND TRANSLATOR THEREFOR
Filed March 27, 1951 21 Sheets-Sheet 13
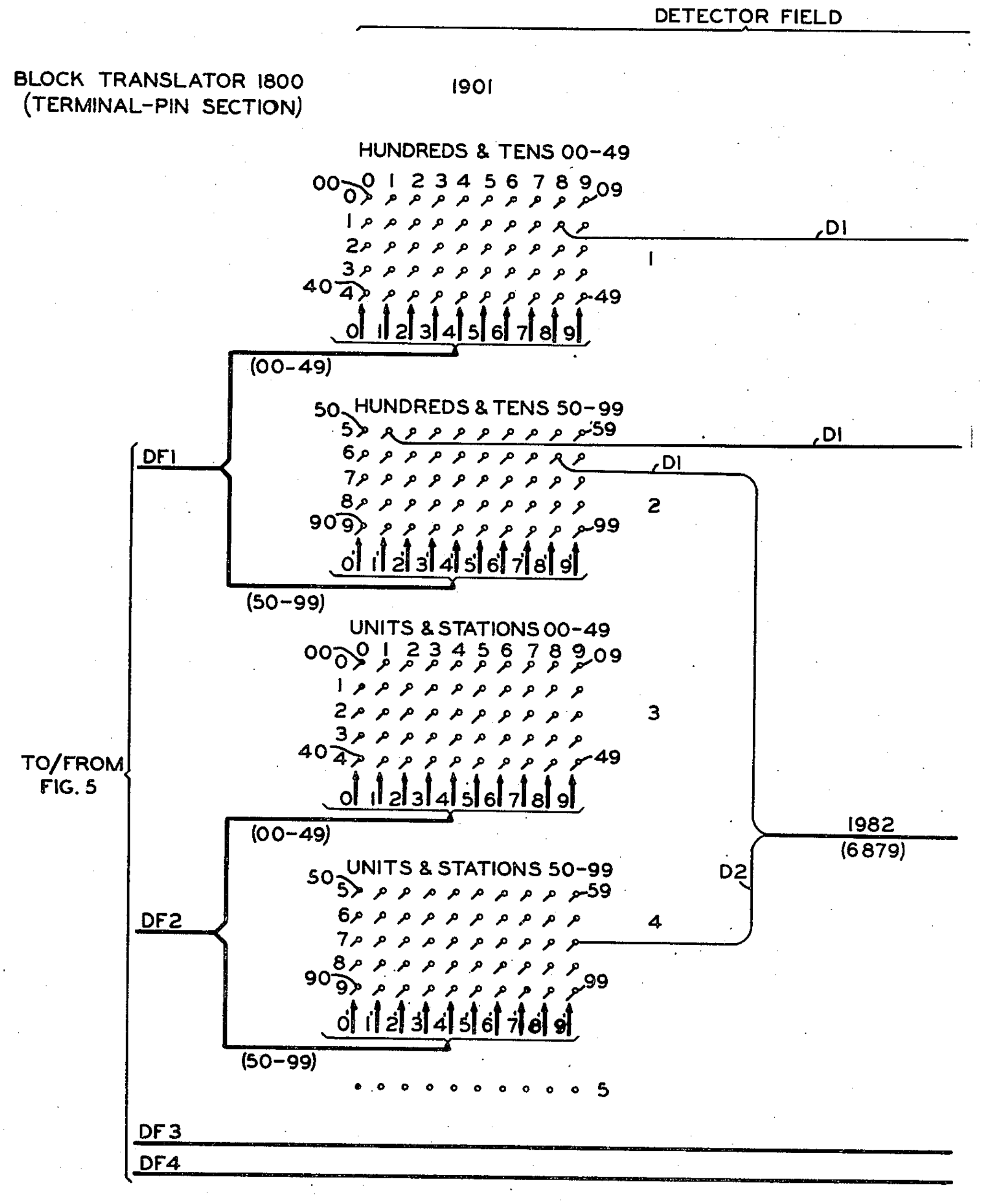
FIG. 6 PART 1
INVENTOR:
RICHARD P. BOYER JR.
BY John J. Bellamy
ATTORNEY June 14, 1955 R. P. BOYER, JR 2,710,893

AUTOMATIC TELEPHONE SYSTEM AND TRANSLATOR THEREFOR

Filed March 27, 1951 21 Sheets-Sheet 14

PART 2

INVENTOR:
RICHARD P. BOYER JR.
BY John G. Bellamy
ATTORNEY

June 14, 1955 R. P. BOYER, JR 2,710,893

AUTOMATIC TELEPHONE SYSTEM AND TRANSLATOR THEREFOR

Filed March 27, 1951 21 Sheets-Sheet 15

PART 3

INVENTOR:
RICHARD P. BOYER JR.
BY John T. Bellamy
ATTORNEY

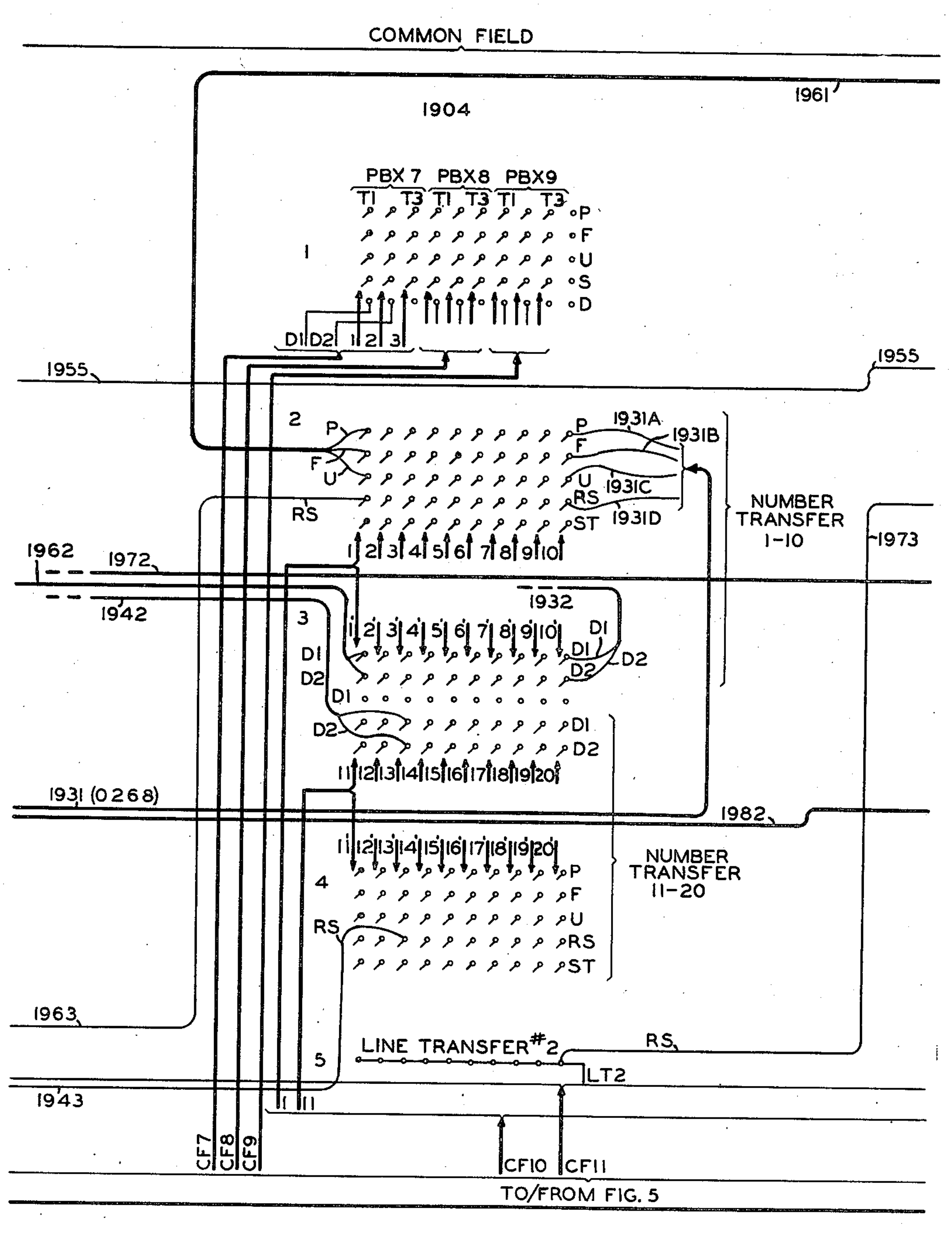
FIG. 6 PART 4
INVENTOR:
RICHARD P. BOYER JR.
BY John J. Bellamy
ATTORNEY

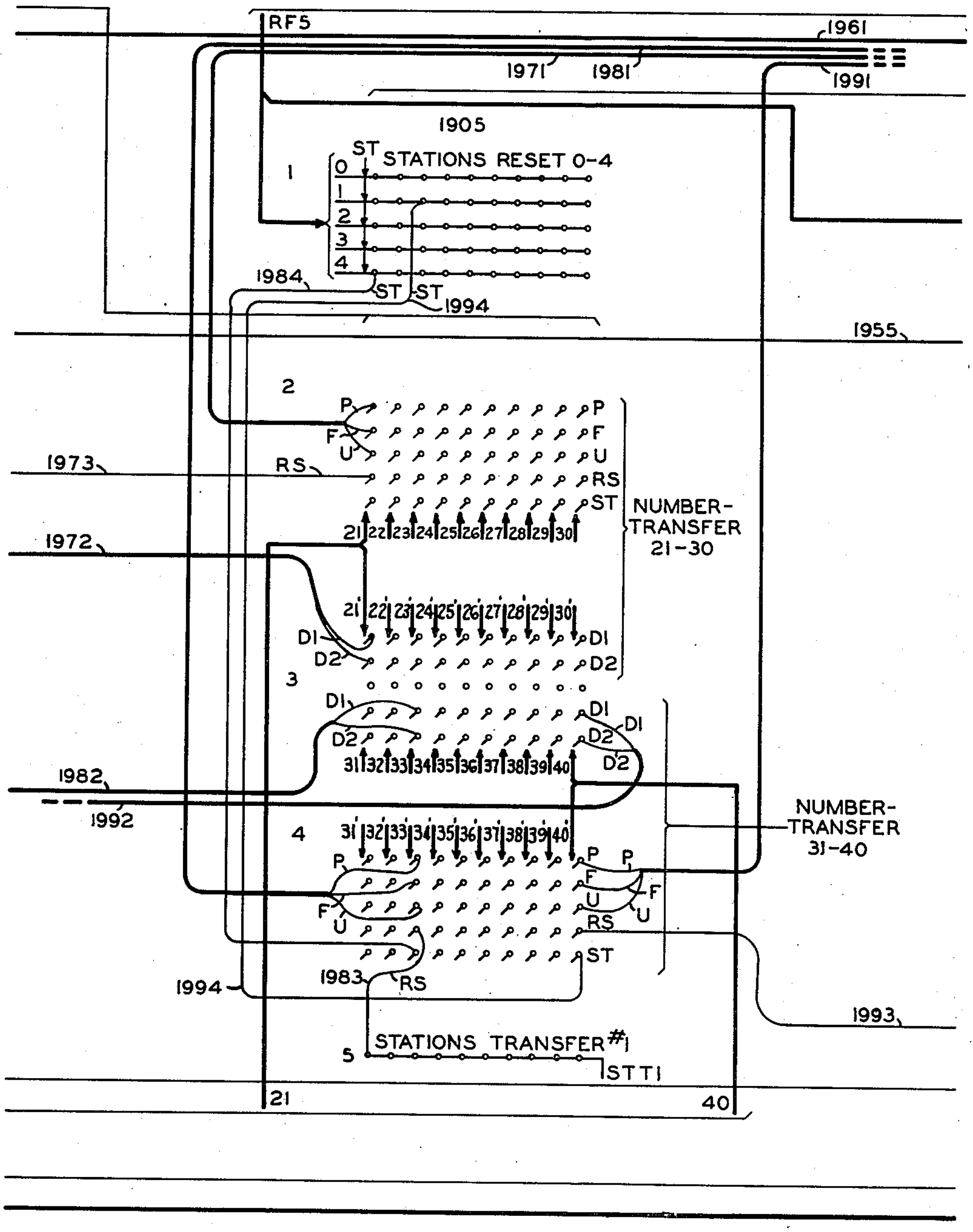
FIG. 6 PART 5
INVENTOR:
RICHARD P. BOYER JR.
BY John J. Bellamy
ATTORNEY June 14, 1955 R. P. BOYER, JR 2,710,893
AUTOMATIC TELEPHONE SYSTEM AND TRANSLATOR THEREFOR
Filed March 27, 1951 21 Sheets-Sheet 18
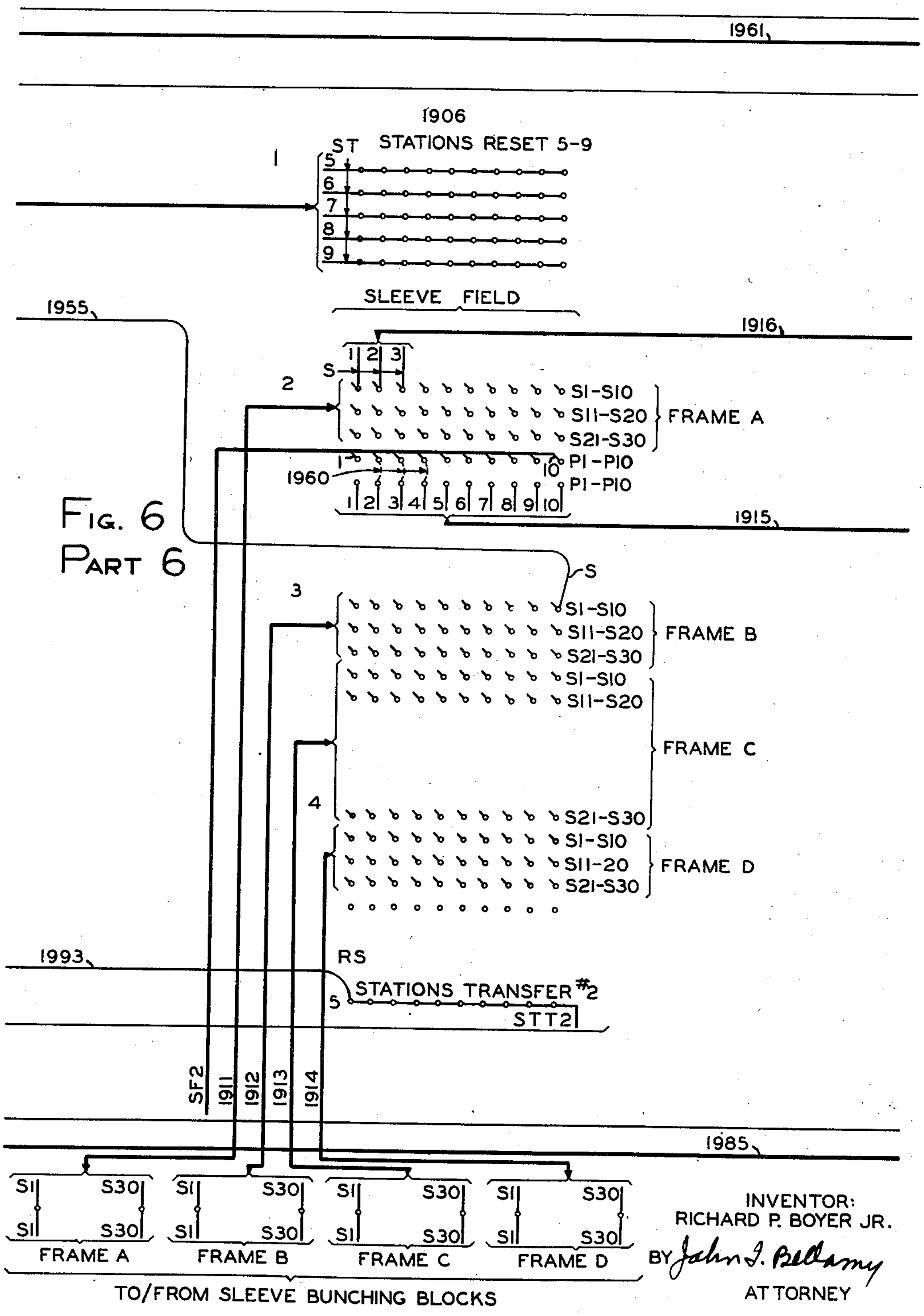
FIG. 6 PART 6
INVENTOR:
RICHARD P. BOYER JR.
BY John I. Bellamy
ATTORNEY June 14, 1955 R. P. BOYER, JR 2,710,893

AUTOMATIC TELEPHONE SYSTEM AND TRANSLATOR THEREFOR

Filed March 27, 1951 21 Sheets-Sheet 19

PART 7

INVENTOR:
RICHARD P. BOYER JR.
BY John I. Bellamy
ATTORNEY

PART 8

INVENTOR:
RICHARD P. BOYER JR.
BY John J. Bellamy
ATTORNEY

AUTOMATIC TELEPHONE SYSTEM AND TRANSLATOR THEREFOR

Filed March 27, 1951 21 Sheets-Sheet 21

INVENTOR:
RICHARD P. BOYER JR.
BY John I. Bellamy
ATTORNEY

United States Patent Office 2,710,893
Patented June 14, 1955

2,710,893

AUTOMATIC TELEPHONE SYSTEM AND TRANSLATOR THEREFOR

Richard P. Boyer, Jr., La Grange, Ill., assignor, by mesne assignments, to International Telephone and Telegraph Corporation, a corporation of Maryland Application March 27, 1951, Serial No. 217,791

15 Claims. (Cl. 179—22)

This invention relates to an automatic telephone system and translator therefor providing transfer and intercept service. Its principal object is to provide a new and improved translator and associated circuit arrangements for use in a primary-secondary-spread crossbar telephone system to permit stations to be transferred from line to line, as required, without a change in the concerned directory numbers.

I. *General description*

This application is a direct improvement on concerned portions of the Bellamy and Bowser application, for a Primary-Secondary-Spread Crossbar Telephone System, Serial No. 85,292, filed April 4, 1949. This Bellamy and Bowser application will hereinafter be termed the "former" application or disclosure. Except as hereinafter pointed out, the system disclosed herein may be as disclosed in the said former application.

As in the former application, the translator of this disclosure is located on the block-link frame; it is adapted to translate the hundreds, tens, and units digit information concerning a locally terminated call into primary, fives, and units information, usable to direct the call to the called line according to its switchboard location.

Also as in the former application, the block translator is arranged and interconnected to normally effect a translation of the line digits of the called number according to the fixed location of the respective line terminations. This translation is referred to as the normal fixed translation. The block translator is also provided with a jumper field and associated relay apparatus enabling it to set aside this normal fixed translation as required and to substitute another translation which will extend the connection to a different line. This substituted translation is referred to as overriding or special translation. The block translator thus has two general purposes and functions. It directs calls both to respective called lines by normal fixed translation and provides standard services by setting up special translation which overrides the normal fixed translation.

In keeping with the noted principal object of this invention, the block translator disclosed herein is so arranged that stations may be transferred from line to line without requiring changes in the concerned directory numbers. The service thus afforded is termed station-number transfer service. In its broadest aspect it is accomplished by substituting overriding translation which will direct the call to the desired new line rather than to the original one, and thus permits the retention of the concerned directory number.

The station-number transfer service herein provided also permits the resetting of the stations register in the concerned block coupler to condition it to provide the proper ringing signal to the transferred station whatever its station location on the line to which it has been transferred.

A further object is to render the noted station-number transfer service applicable to lines (such as twenty-station lines) serving two groups of stations through having two line numbers assigned thereto, as will hereinafter appear.

A still further object is to render the system more flexible with respect to assigning lines and line numbers to two-group or twenty-station service.

A further object is to improve and economize the circuit organization of the block translator in line with the foregoing and in the performance of overriding translation for other purposes, such as line-number transfer and line and station intercept service.

One related feature is that a common group of general-purpose detector and control relays is provided, any one of which can be adapted (by the running of suitable detector service and reset jumpers) to provide either line-number or station number transfer service, with or without a station-reset operation or to provide line or station intercept service. The necessity of separate groups of relays for these several respective service requirements is thereby avoided.

Other related features concern the provision of additional detector terminals so marked in combination as to permit either a three-digit line number or a four digit line and station number to be detected by a two-winding detector relay, as well as the provision of a plurality of sets of station bus bars specific respectively to concerned service requirements, and related features of circuit improvement.

Still another feature relates to a simple and reliable circuit arrangement for controlling the resetting of the stations register of the currently associated block coupler by stopping its resetting operation by control exercised by it over any desired one of the ten stations digit wires extending between the block couplers and the block translator, as well as to a simple and reliable circuit arrangement for positively stopping the resetting advance of the stations register directly responsive to its arrival in marked position, rather than through the medium of a stopping relay action, which may be too slow when the resetting advance is very rapid.

A further feature concerns a provision for withholding the clearing out of the common apparatus until the resetting operation (when required) of the stations register in the currently associated block coupler has been completed, under the control of the block translator, with which it is currently individually associated.

Other objects and features of the invention will become apparent as the description progresses.

IA. *Drawings*

The accompanying drawings, comprising Figs. 1 to 8, disclose a preferred embodiment of the invention as follows:

Figs. 1 to 4 taken together show in detail the circuit path and intimately associated electrical equipment employed in extending talking connections from a calling line to a called line by way of a line-link and an originating trunk on line-link frame A (Fig. 1), block coupler 500 (Fig. 2), a block link and a terminating trunk on the block-link frame (Fig. 3), and the line-link of the line-link frame B (Fig. 4) containing the called line, Fig. 1 shows apparatus on line-link frame A, Fig. 2 show portions of circuit details of the block coupler, Fig. 3 shows the apparatus on block-link frame, and Fig. 4 shows the the apparatus on line-link frame B.

Fig. 5 (Parts 1 to 8) is a circuit diagram of the relay section of the block translator on the block-link frame;

Figs. 7 to 9 show the way in which sheets of drawings on which Figs. 1 to 6 are drawn, should be arranged in order to be understood best.

II. *General operation* (*Figs. 1 to 4*)

The operations involved in completing calls will now be described. This part of the description covers in complete detail the operation of the portions of the apparatus directly included in the talking paths through the line-link frames and the block-link frame.

IIA. *Initiation of call*

Figure 1:
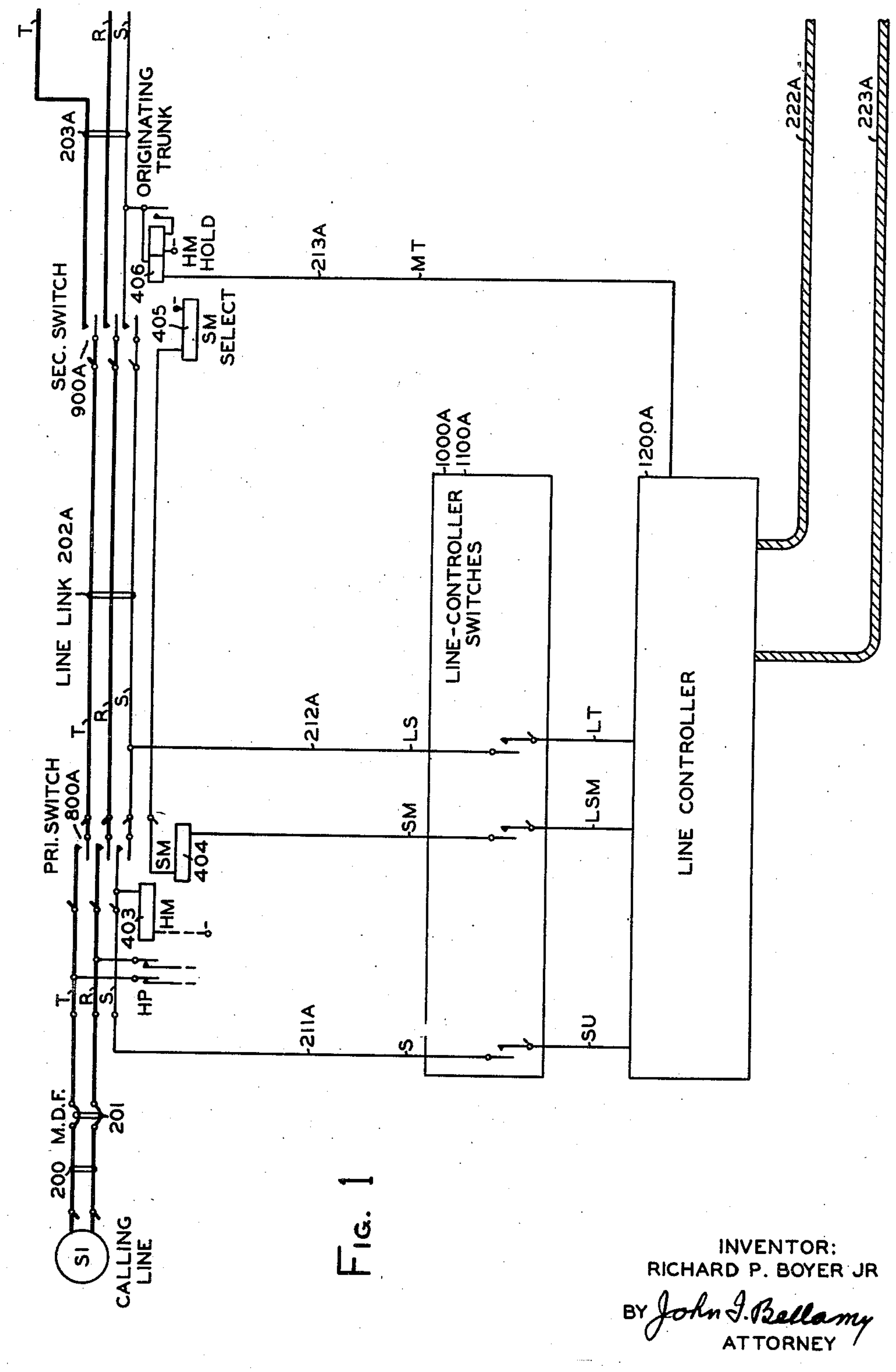

When the receiver (not shown) is removed at calling station S1 of Fig. 1, the usual direct current bridge is closed across tip and ring conductors T and R of line 200. As described in the noted former application, line controller 1200A sets line-controller switches 1000A and 1100A upon the calling primary switch 800A with specific reference to the group of lines including the calling line. Upon being so set, the line-controller switches close the indicated open points therein. Line-controller 1200 now matches an idle path from calling line 200 to an originating trunk. This path may be assumed to be over line-link 202A to originating trunk 203A. The test circuit for line-link 202A from line controller 1200A is from line-test conductor LT through contacts of one of the line-controller switches to link-sleeve wire LS, connected to the sleeve of line-link 202A. The test is for an idle indicating battery potential on the sleeve of the noted line-link. If line-link 202A is busy, holding ground potential thereon causes the link to test busy, but idle-indicating battery potential is effectively received by the line controller when the line-link is idle.

When originating trunk 203A (being connected to block coupler 500 through jumper 204, Fig. 2) is idle, the line controller 1200A receives an idle indicated battery potential over match-test conductor MT–213A, through the winding of hold magnet 406 and break contacts 2 of relay 505 to resistance battery. On the other hand, when originating trunk 203A is in use, the idle-indicating battery potential on its sleeve conductor S is replaced by a ground potential.

Upon matching a path over line-link 202A to originating trunks 203A, line controller 1200A grounds link-select magnet wire LSM closing a circuit through contacts of one of the line-controller switches and over a select-magnet wire SM for primary and secondary select magnets 404 and 405 which are associated with the primary end and with the secondary end respectively, of line-link 202A. Select magnet 404 and 405 thereupon operate to effect mechanical selection of line-link 202A at primary switch 800A and at secondary switch 900A. When select-magnets 404 and 405 have both operated to effect the noted selection, the line-controller 1200A operates hold magnets 403 and 406 to extend the calling line over the selected line-link 202A to the matched originating trunk 203A. Hold magnet 403 is operated by the line controller upon the application of ground potential to the illustrated sleeve-unit conductor SU, which is extended through contacts of one of the line controller switches to sleeve conductor S211A (an extension of sleeve conductor S of the calling line), thence to battery through hold magnet 403. Upon operating, hold magnet 403 closes the illustrated stackup of contacts on primary switch 800A to extend calling line 200 to line-link 202A.

Line controller 1200A operates hold magnet 406 by applying ground potential to match-test conductor MT–213A, closing a circuit through the winding of hold magnet 406 over the previously traced idle-indicating path. Upon operating, hold magnet 406 connects conductors T, R, and S of line-link 202A respectively to the corresponding conductors of the originating trunk 203A, completing the extension of the calling line to the calling trunk causing block coupler 500 to be seized. Shortly there-after, line-controller 1200A clears out and permits line-controller switches 1100 and 1000A to clear out, leaving the extended connection held by ground applied to the sleeve conductor thereof by the seized block coupler 500.

IIA1. *Seizure of the block coupler*

When the described extension of a connection from calling line 200 to block coupler 500, over line link 202A, originating trunk 203A, and jumper 204, is completed, line relay 503 operates over the calling line through break contacts 1 and 2 of relays 501 and 502. Line relay 503, at its contacts 1 operate hold relay 504 from ground at contacts 7 of switch-through relay 501.

At its contacts 4, relay 504 grounds the winding of relay 505 operating it. The contacts 2 of hold-auxiliary relay 505 remove the idle-indicating battery and place a ground on the sleeve wire S of the calling line. The established connection, from the calling line to the block 500, is thereby maintained after the line-controller apparatus of Fig. 1 has cleared out.

IIA2. *Receipt of digit pulses*

On completition of the noted seizing of the block coupler 500, the calling subscriber dials the digits in the directory number of the called line and station.

As described in the noted former application, each time the calling device is operated to transmit a series of circuit-interruption impulses, line relay 503 is restored momentarily for each such interruption impulse in a series, comprising 1 to 10 impulses, depending on the digit dialed. The dialing of the digits of the directory number causes the digit registers, (shown in the former application) to register the dialed digits. As described in the noted former application, these registers comprise the initial digit register IRD, the hundreds register HR, the tens register TR, the units register UR, and the stations register SR.

IIA3. *Calling-in of the block controller*

On completion of the dialing of the last digit (station digits), block controller 1600 is associated with the calling block coupler. Terminating chain relay 516, at its contacts 6 ground the selected ones of the leads of the groups H, T, U, and ST which extend to block translator 1800 over cable 220. The stations lead ST extend to block translator 1800 from the register SR through break contacts 1 to 10 of transfer relay 518.

IIB. *Block translator operation*

As hereinafter described, operation of block translator 1800 effects a translation of the registered directory number, according to the physical location of the called line and transmits this information to the line controller of the line-link frame at which the called line terminates.

IIC. *Testing the called line*

As noted, the block translator transmits a suitably translated version of the hundreds, tens and units digits of the directory number to the line controller on the line-link frame at which the called line terminates. The station digit information is used only for ringing control purposes and for station selection and hence is not transmitted to the line controller.

Figure 4:
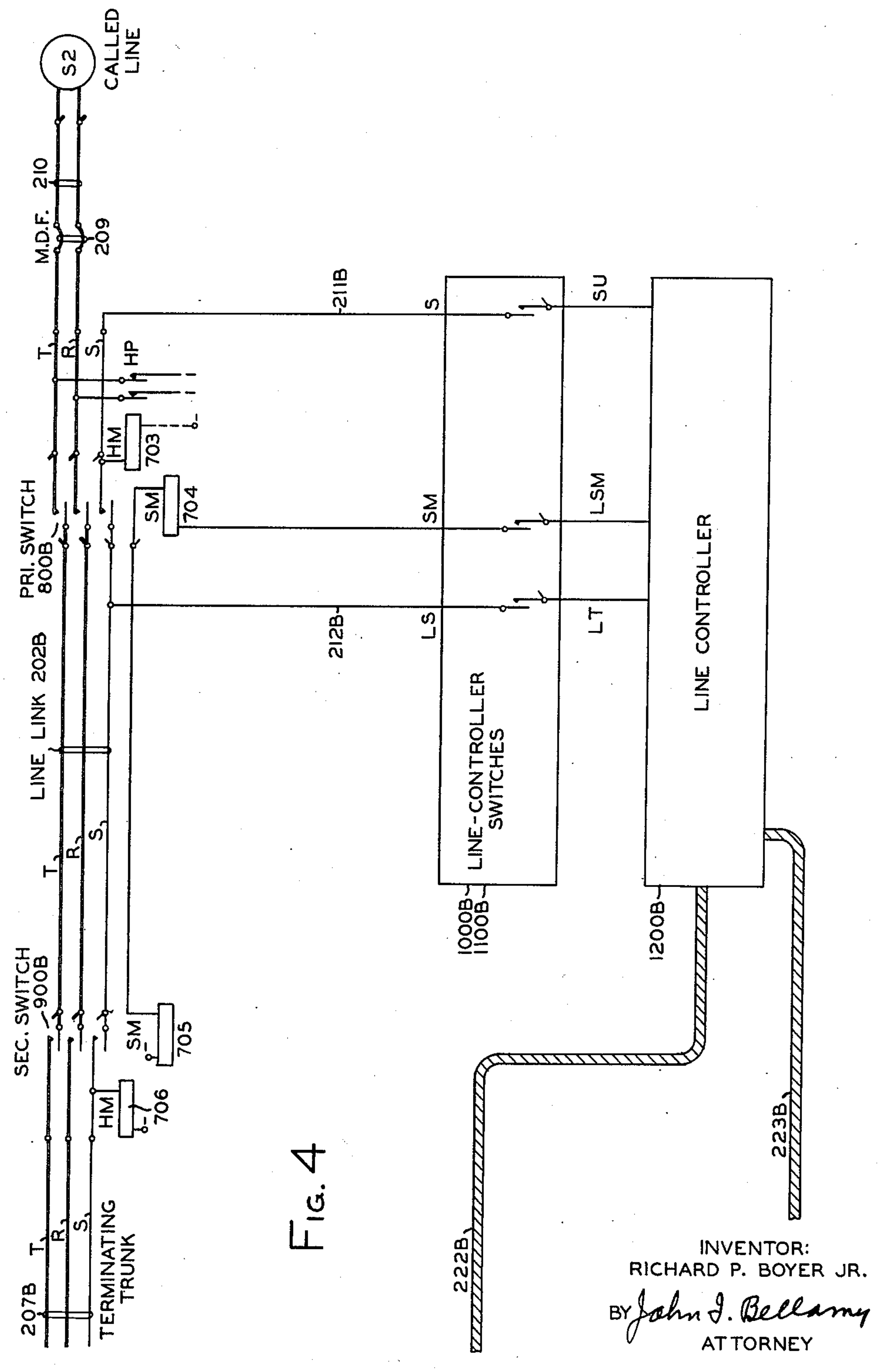

If the illustrated station S2 is the one called, it is served by a frame which includes the apparatus shown in Fig. 4. In this event, the translated digit information is sent to line-controller 1200B over conductors in cable 223B.

On receiving the translated digit information, indicating which primary switch (primary switch 800B, Fig. 4) serves the line being called, and indicating the fives and units location of the called line thereon, line controller 1200B identifies itself at block controller 1600 by a signal transmitted over a conductor in a group 222B which causes line controller switches 1000B and 1100B to be positioned in accordance with line-link primary switch 800B and in accordance with the fives group thereon in which called line 210 is located.

When switches 1000B and 1100B have been set, one of them extends the sleeve conductor S–211B of the called line over a sleeve-units wire SU to line controller 1200B, whence it is extended over a conductor in cable 222B to block controller 1600 to enable the line to be tested as to its busy or idle condition. At the same time, each of the ten link sleeve associated with the called primary switch 800 is connected to the line-controller through one of the line-controller switches. For example, the sleeve of the illustrated link is connected through line-sleeve wire LS–212B and link test wire LT. The busy or idle condition of the line links of primary switch 800 is separately indicated to block controller 1600 over respective conductors in cable 222B.

IIC1. *Called-line seizure*

If the called line is idle, and if an idle path can be matched thereto, block controller 1600 matches such a path, such as over a block link 206U (Fig. 3), terminating trunk 207B, and line link 202B. Block link 206U is selected mechanically at switches 1300 and 1400 by the operation of select magnets 604 and 607. Line link 202B is selected mechanically by the operation of select magnets 705 and 704. Their circuit is closed at the block controller over a wire in cable 222B, through line controller 1200B, wire LSM, contacts of one of the line controller switches, the associated select magnet wire SM, and thence to battery through magnet 704 and 755 in series.

With magnets 705 and 704 operated, the block controller grounds the sleeve of the called line 210 (Fig. 4) over the noted test extensions theerof, thereby operating hold magnets 703. Magnet 703 connects the called line to the selected line-link 202B. Block controller 1600 also grounds the sleeve wire of the matched terminating trunk 207B (by way of wire MT–226, thereby operating hold magnet 610 on the block-link frame and magnet 706 on the line-link frame. Block-link 206U is thereby extended over conductors T, R, and S of trunk 207B to line link 202B. Block controller 1600 also operates the associated primary hold magnet 602 over a conductor in cable 221 to complete the connection with the matched path to the called line. As pointed out in the noted former application, operation of hold magnet 602 operates switching relay 513 in the block coupler over wire HP.

Upon the completion of the foregoing operations, block coupler 500 begins to apply ringing current to the called line to signal the called station S2 thereon over the established connection across the block-link frame and across the called line-link frame, and the items of common apparatus (block-controller switch 1500, block controller 1600, block translator 1800, and line-controller apparatus 1000B to 1200B) are promptly returned to common use, leaving the connection intact between the calling and called lines.

IIC2. *Answering*

When the called party answers, the calling line receives the usual supervisory functions by the operation of relay 502 and the calling station may converse with the called station.

IIC3. *Disconnect*

Responsive to the replacing of both receivers at the calling and called lines, block coupler 500 opens front and rear holding circuits which it previously held closed, whereupon the existing connection is broken at each of the switches 800A, 900A, 1300, 1400, 900B and 800B.

IID. *Reverting call*

The operation of the block translator in providing a primary, fives, and units translation of the directory number of a reverting call is as described for a locally terminating call, such as a call to station S2 on line 210.

The block controller performs no matching operation as the called line tests busy since it is the calling line. The block controller does signal the block coupler that the call is a revertive call and the block coupler thereupon is inverted as described in the noted former application.

IIE. *Block coupler 500*

It has been chosen to illustrate block coupler 500 (Fig. 2) as the harmonic-ringing coupler 500–L of the noted former application, modified according to the teachings of my pending application, A Block Coupler, Serial No. 190,030, filed October 13, 1950, regarding the resetting of the stations register.

When code-ringing is employed, each of the block couplers 500 (Fig. 2) is replaced by the code-ringing block coupler 2200 of the former application, likewise modified according to my noted pending application.

IIE1. *Ringing control*

Harmonic-ringing block coupler 500, modified as above stated provides a semi-selective ringing service (one-ring and two-ring) for twenty-station lines, as shown in the following ringing chart;

IIE2. *Twenty-station harmonic-ringing chart*

| | Stations Digit | Wire RR | Frequency | |
|---|---|---|---|---|
| First Group | 0 | Open | 1 | 1 short on tip. |
| | 1 | do | 2 | |
| | 2 | do | 3 | |
| | 3 | do | 4 | |
| | 4 | do | 5 | |
| | 5 | Closed | 1 | 2 shorts on ring. |
| | 6 | do | 2 | |
| | 7 | do | 3 | |
| | 8 | do | 4 | |
| | 9 | do | 5 | |
| Second Group | 0 | Closed | 1 | 1 short on ring. |
| | 1 | do | 2 | |
| | 2 | do | 3 | |
| | 3 | do | 4 | |
| | 4 | do | 5 | |
| | 5 | Open | 1 | 2 shorts on tip. |
| | 6 | do | 2 | |
| | 7 | do | 3 | |
| | 8 | do | 4 | |
| | 9 | do | 5 | |

The ringers of stations 0 to 4 of the first group and of 5 to 9 of the second group of stations on the line are connected between the tip conductor and ground, and the ringers of stations 5 to 9 of the first group and of 0 to 4 of the second group of stations are connected between the ring conductor and ground.

The placing of ringing current on the tip conductor or the ring conductor is controlled by ring-reverse wire RR. Ring-reverse relay RI-RE (Fig. 2) operates and at its contacts 1 and 2 place the ringing current from the INT-GEN leads to the tip or ring conductor as described in the noted former application.

The grounding or closing of ring-reverse wire RR, to provide the noted twenty-station harmonic-ringing service in conjunction with the specific setting of the stations register, is controlled by the second-group relay in block translator 1800 as will hereinafter be described.

III. *Block translator 1800 (Figs. 5 and 6)*

Figure 3:
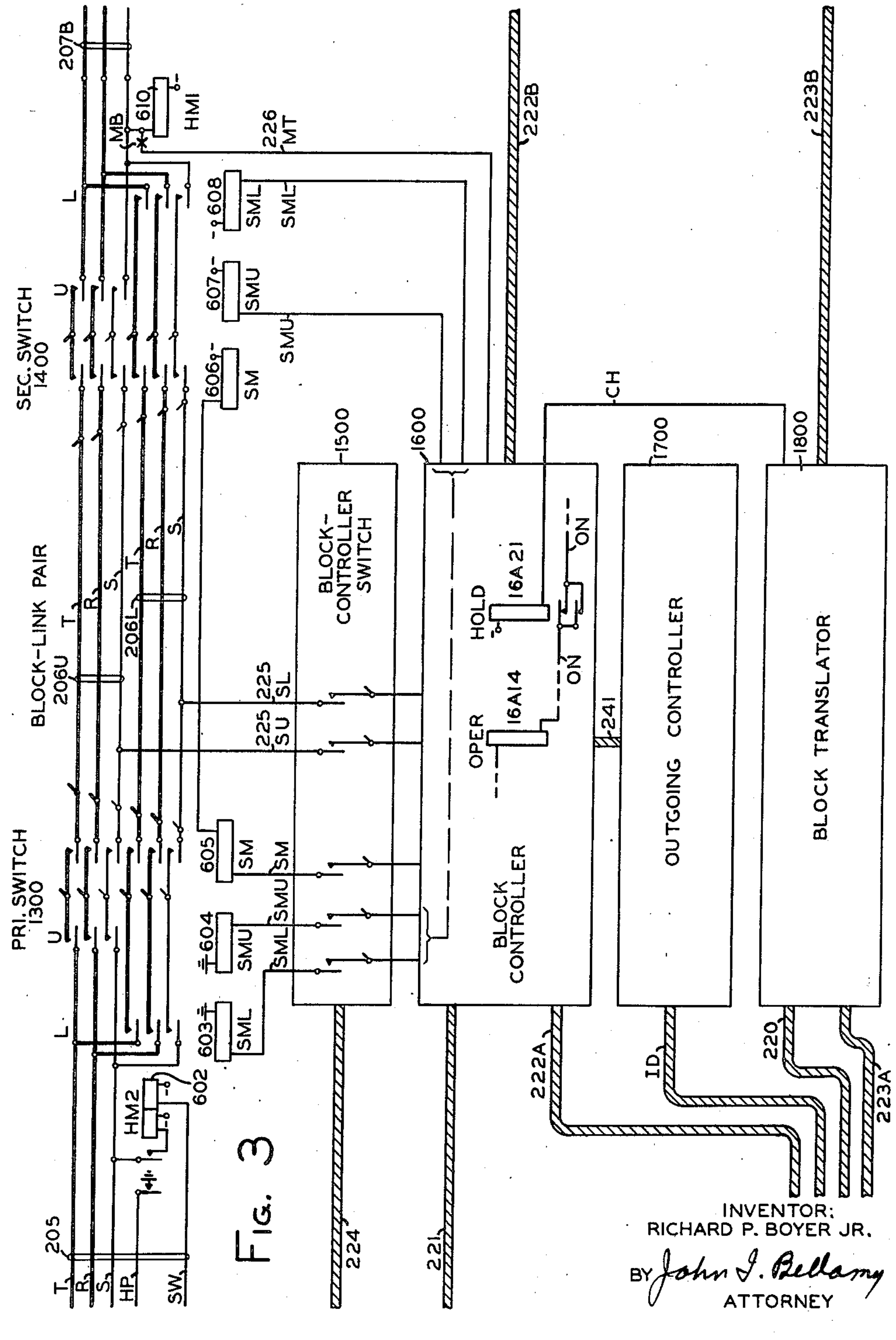
Figure 6:
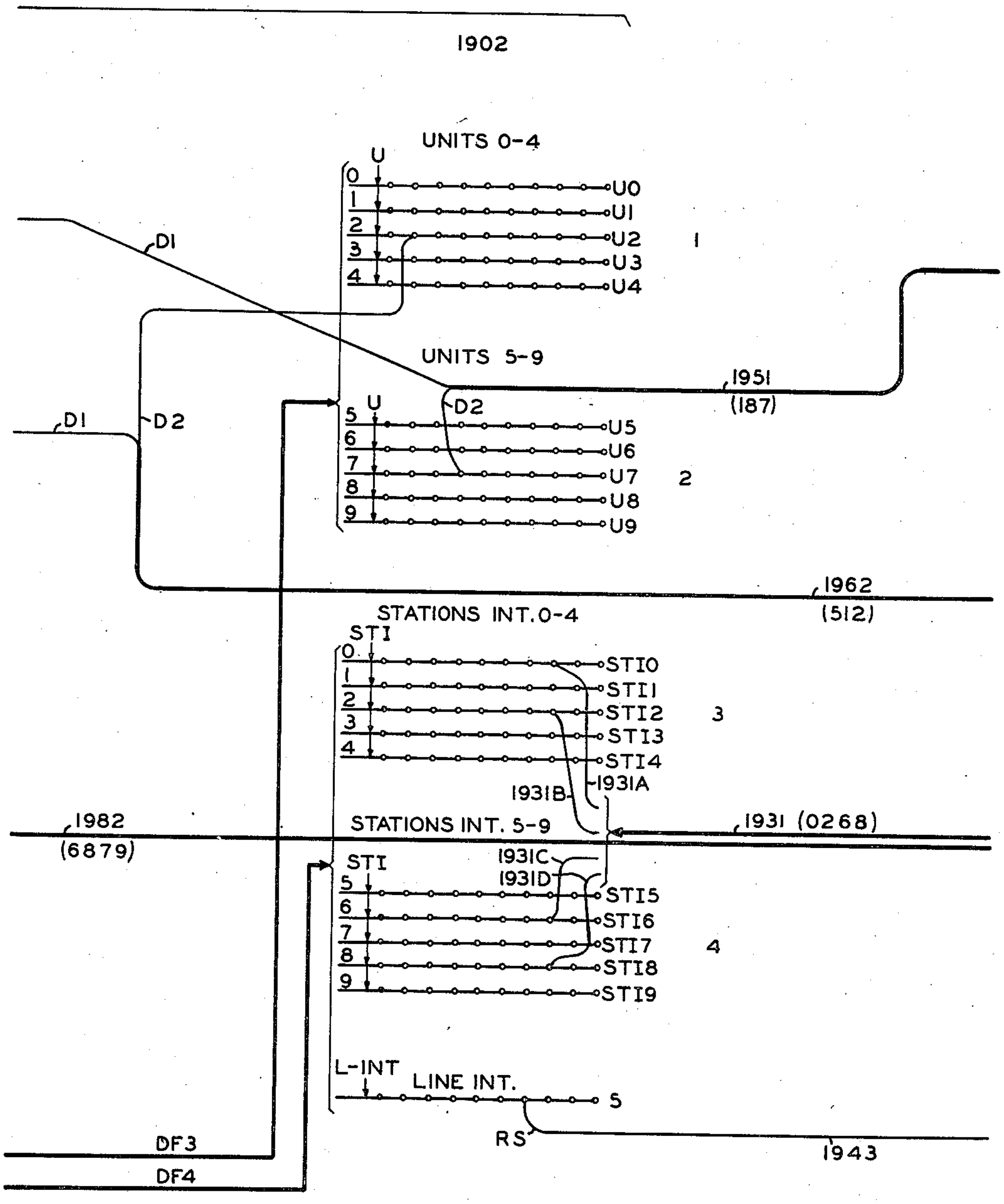
Fig. 6 (Parts 1 to 8) show a circuit and wiring diagram of the pin-terminal section of the block translator.
Figure 6:
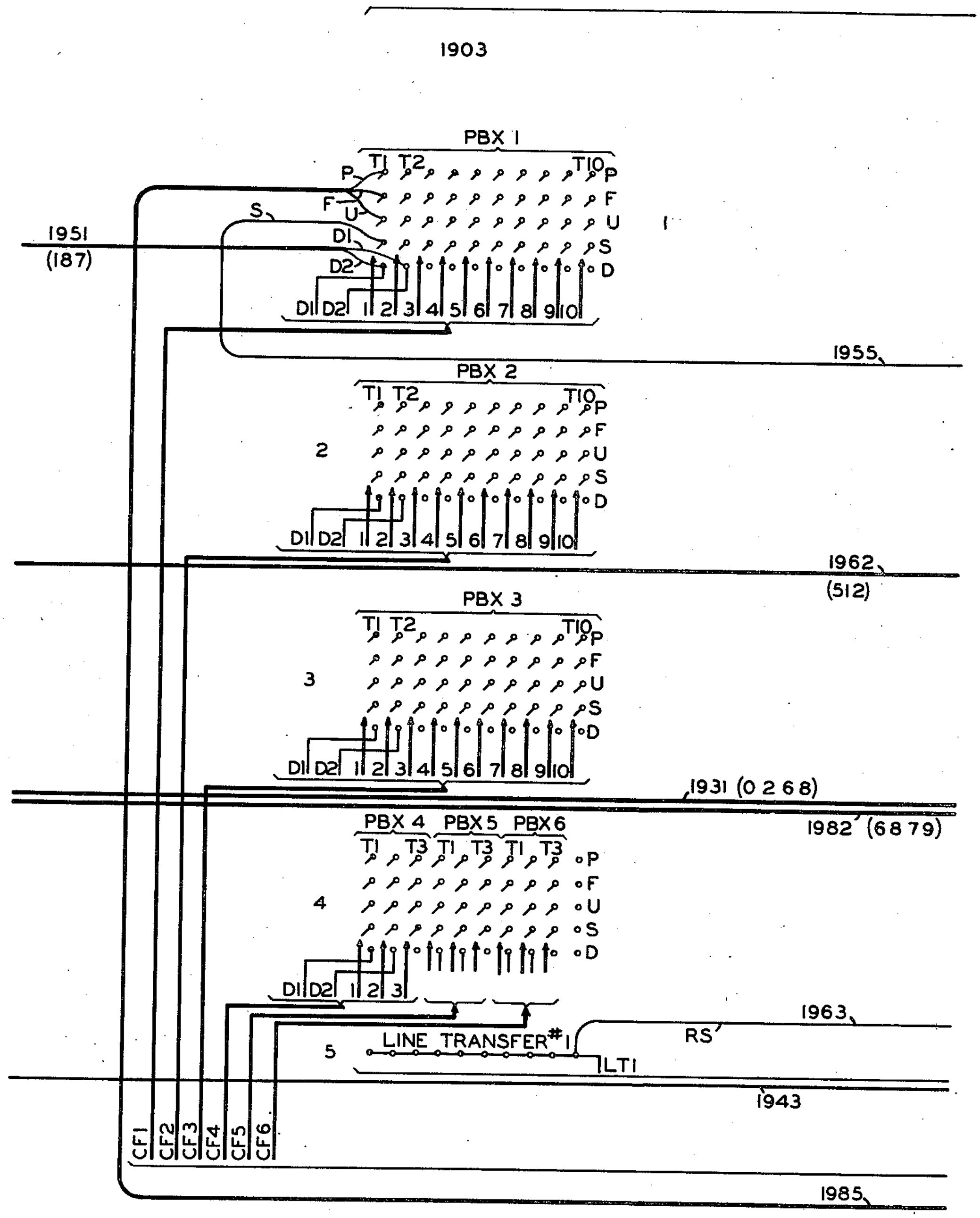
Figure 6:
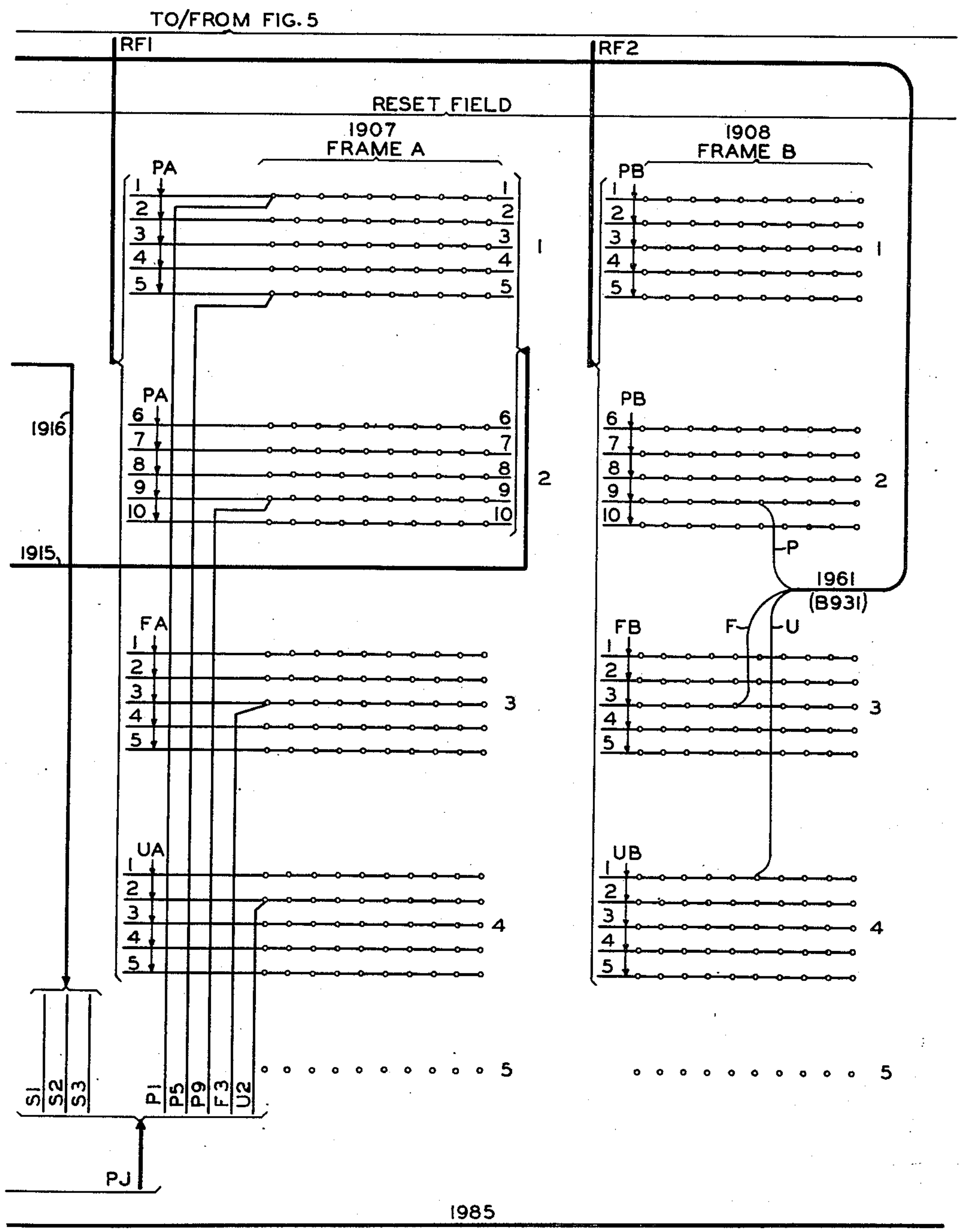
Figure 6:
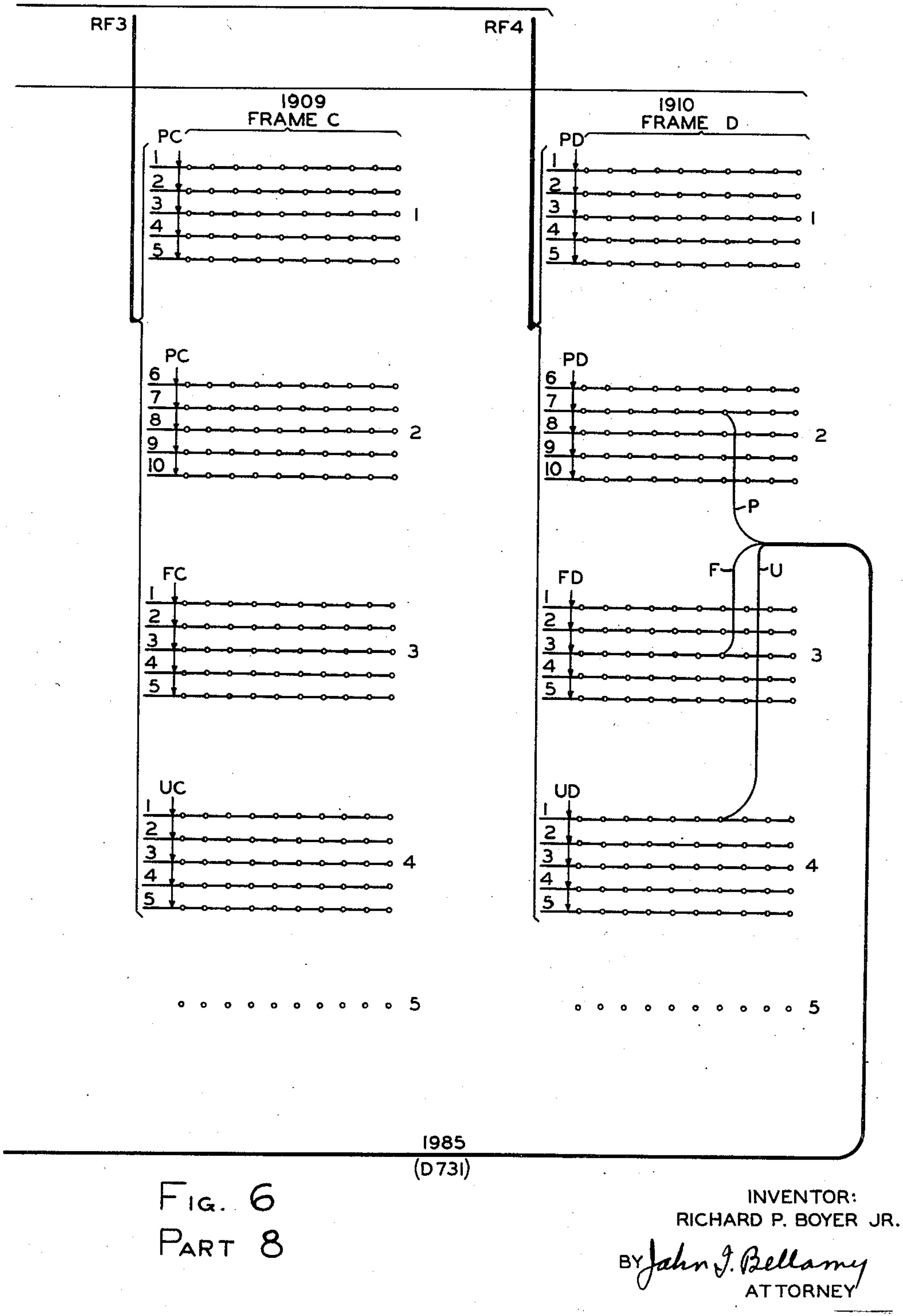
Figures 7, 8, 9:
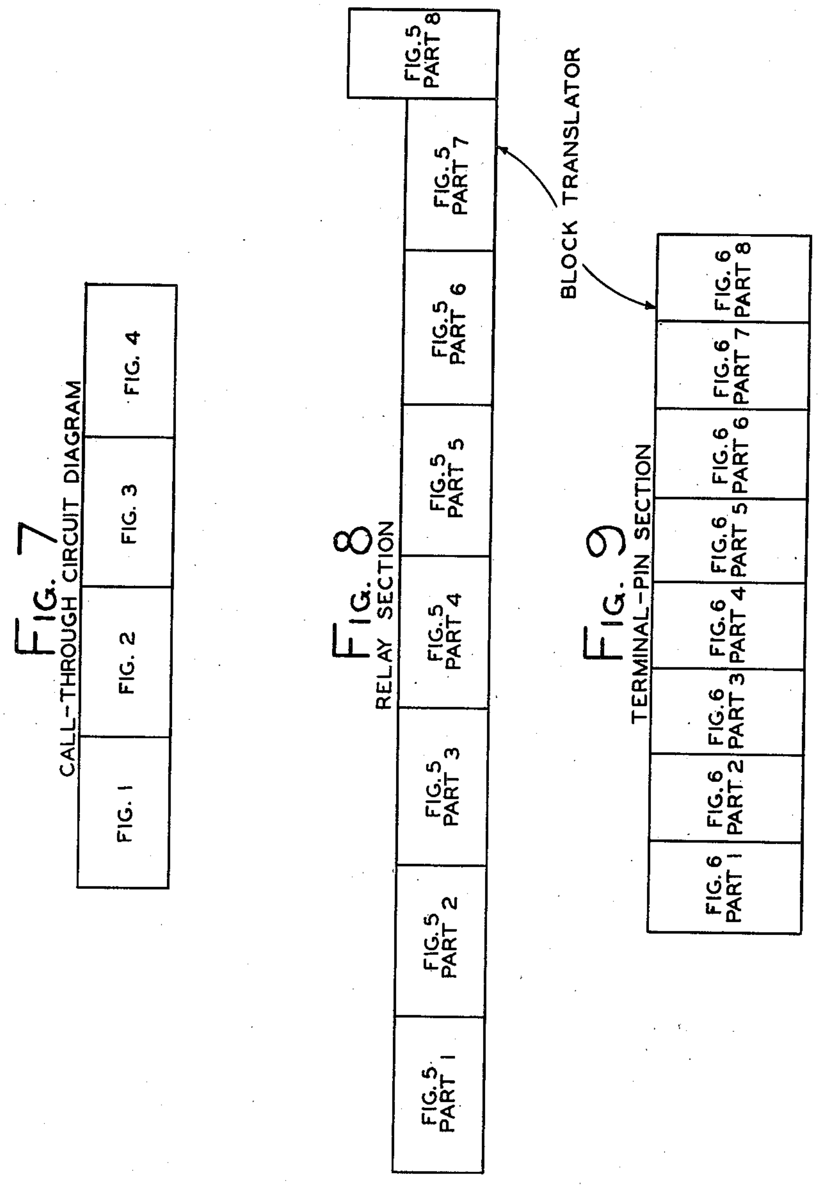

The block translator 1800 shown as a rectangle in Fig. 3, is shown in full in Figs. 5 and 6. Fig. 5 (Parts 1 to 8) is termed the relay section as it illustrates the portion of the translator which includes the relays and associated circuits elements. Fig. 6 (Parts 1 to 8) is termed the terminal-pin section as it illustrates the section of the block translator which comprises blocks or columns of insulated terminal pins, whereat jumpers may be installed as desired to cause a normal fixed translation for selected called line or stations to be replaced by overriding translation to direct the concerned calls to the desired other line terminal and desired station therein as a part of its operation in providing normal fixed translation.

IIIA. *Purpose and function*

As noted, the block translator has the two general purposes and functions. It provides both normal fixed translation, and special translation which overrides the normal fixed translation.

IIIA1. *Call direction by normal fixed translation*

As disclosed in the noted former application, the 1000 lines are served by four-line-link frames A, B, C, and D. Line numbers 000 to 249 are assigned to the 250 lines served by the ten primary switches of line-link frame A; line numbers 250 to 499 assigned to line-link frame B; line numbers 500 to 749 are assigned to line-link frame C; and line numbers 750 to 999 are assigned to line-link frame D. The translated numbers at any line-linke frame run consecutively (by tens, fives, and units) from 111 to 055, being the same two hundred and fifty translated numbers for any line-link frame. The block translator directs any translated number to the line-link frame which the called line terminates. These lines served by line-link frames A, B, C, D are grouped non-decimally on the line-link frames instead of a decimal groupings by hundreds and tens. Therefore translation is required to indicate the physical location of the called line on the concerned line-link to direct a call thereto. On receipt of the hundreds, tens, units, and stations digit of the called number, the block translator selects the concerned line-link frame and sends to it a translated equivalent number containing translated primary, fives, and units digits respectively identifying the involved switch on the called line-link frame, the fives group of lines on the switch in the units location of the called lines within the group of five.

IIIA2. *Standard services by overriding translation*

The second purpose and function of the block translator is to direct the performance of standard services which are referred to herein as (1) Group control twenty-station service,
(2) Common number service,
(3) Line-number transfer service,
(4) Station-number transfer service,
(5) Line-intercept service,
(6) Station-intercept service,
(7) Individual control twenty-station service, and
(8) Station-number transfer service for twenty-station lines.

The block translator performs these standard services for an assigned called number by setting aside the normal fixed translation in favor of an overriding translation which is effective to direct a call to the pre-assigned different location or to an idle line of the pre-assigned group.

The above standard services are more fully stated as follows:

1. Group control twenty-station service, when employed, provides a special case of number-transfer service which permits up to fifty twenty-station lines by converting the five lines in the fourth fives group of any primary switch on line-link frame A to twenty-station service.

2. Common-number service is employed to extend calls for the directory number of a group of lines (such as a P. B. X group) to an idle line of a group.

3. Line-number transfer service, when employed, transfers the call to a new line location when the switchboard-terminal location of the called line has been altered at the main distributing frame to balance traffic, thereby avoiding changing line numbers.

4. Station-number transfer service, when employed, transfers the call to the new line and station location of a transferred station and resets, if necessary, the station register of the concerned block coupler to provide the proper ring for the transferred station.

5. Line-intercept service, when employed, transfers the call from a given called line, to an intercept trunk, leading to an intercept operator.

6. Station-intercept service, when employed, transfers a given station of multi-station line, to an intercept trunk leading to an intercept operator.

7. Individual control twenty-station service, when employed, permits individual twenty-station lines to be made up of unassigned lines other than those in the fourth fives group as noted for group control twenty-station service.

8. Station-number transfer service for a twenty-station line, when employed, transfers the call to a station moved to the second group of stations on a twenty-station line.

The normal fixed translation is carried out through permanent wires interconnecting contacts of relays of Fig. 5. Overriding translation, when affected for any called number, is carried out by jumper connections between terminal pins as shown in Fig. 6. Additional relay apparatus of Fig. 5 not used in the normal fixed translation is thereby brought into play as will be hereinafter described.

IIIB. *Functional relay groups*

The relays of the block translator comprise separate functional groups as follows:

1. Relays 18D1 and 18D2 are the normal twenty-station service group. They are used when block couplers which are arranged for twenty-station service are used, in which case they control the twenty-station ringing for certain lines.

2. Relays 18D3 and 18D4 are the reset group, called into play only when overriding translation is required. They act to cancel the fixed translation and to put the indicated overriding translation into effect.

3. Relays 18E1 to 18F10 (18E1 to 18E30 and 18F1 to 18F10) are the forty relays of the number-transfer group. When a line has been transferred from one terminal location to another by a jumper change on the main frame, with no corresponding change in the number of the transferred line, or when a station has been transferred from one location to another and yet retains the original directory number, an available one of the relays of the forty relays 18E1 to 18F10 is assigned to that line or station to effect overriding translation to cause the call to be directed to the new location of the called line or called station, rather than to its original location.

Relays 18E1 to 18F10 are also available for intercept purposes. An available one of the noted relays is assignable to respective lines or stations requiring intercept service. On intercept service, intercept call-in relay 18D30 under control of intercept-control relay 18F16 is operable by any number-transfer relay 18E1 to 18F10 when the proper jumper (Fig. 6) has been connected for intercept service. When operated, relay 18D30 calls in both relays (18D3 and 18D4) of the reset group to indicate an overriding translation to direct the call to an idle trunk leading to the intercept operator.

4. Relays 18D5 to 18D14 comprise a ten-relay group allotter. It is called-in whenever the number dialed indicates that the call is for a common-number group. It acts to test up to ten lines in the called group to indicate an overriding translation which will direct a call to an idle line of a group. It is also used to direct an intercepted call to an idle trunk leading to an intercept operator.

5. Relays 18D15, 18D16 and 18D17 control up to ten lines or trunks in a common-group referred to as P. B. X group 1. Any desired line number in the 1000-line block of numbers may be assigned as the call number to operate these relays to bring the lines of the group to the group allotter for test. Relays 18D18 to 18D20 (not shown) and relays 18D21 to 18D23 are similar three-relay groups assigned respectively to ten-trunk groups, identified as P. B. X groups 2 and 3, "P. B. X" being the common abbriviation of private branch exchange.

6. Relay 18D24 controls up to three lines or trunks in a common-number group referred to as P. B. X group 4. This relay is operated by any assigned line number to bring the lines of its group into the group allotter for test. Relays 18D25 to 18D28 (not shown) and relay 18D29 are similar relays respectively controlling three trunk groups as referred to as P. B. X groups 5 to 9.

7. Register relays 18A1 to 18A10 and alarm relay 18B11 comprise the hundreds groups. One or another of the relays 18A1 to 18A10 operates, depending on the hundreds digit dialed.

8. Register relays 18A11 to 18A20 and alarm relay 18B12 comprise the tens group. One or another of the relays 18A11 to 18A20 operates, depending on the tens digits dialed.

9. Register relays 18A21 to 18A30 and alarm relay 18B13 comprise the units groups. One or another of the relays 18A21 to 18A30 operates, depending on the units digits dialed.

10. Register relays 18B1 to 18B10 and alarm relay 18B14 comprise the stations group. One or another of relays 18B1 to 18B10 operates, depending on the station digits dialed.

11. Translating relays 18B15 and 18B16 comprise the fives group, they correspond respectively to the first five lines (0 to 4) in a group of ten and to the last five lines (5 to 9) in the group of ten.

12. Translator relays 18B23 to 18B26 comprise the 25's group. They correspond respectively to the first, second, third, and fourth 25-line groups (00 to 24, 25 to 49, 50 to 74, and 75 to 99) in any hundreds group. They are controlled by the tens registers relays 18A11 to 18A20, assisted by fives relays 18B15 and 18B16 when the tens register relay operated is 18A13 or 18A18.

13. Translating relays 18B27 to 18B30 are the 250's relays corresponding respectively to the line-link frames A, B, C, D, which in turn correspond to the first, second, third, and fourth 250-line groups (000 to 249, 250 to 499, 500 to 749, and 750 to 999) in the 1000-line block. They are controlled by the hundreds register relays 18A1 to 18A10, assisted by the 25's relays 18B23 to 18B26 if hundreds relay 18A3 or 18A8 is operated.

14. Station-reset-control relays 18F11 to 18F14 control the resetting of the stations registers in the concerned block coupler according to the new location of the desired station when overriding translation is effected on station-number transfer service.

15. Second-group relay 18F15 is controlled by jumpers connected as shown in Fig. 6 when individual control twenty-service is required or when station transfer service for a twenty-station line is required. Relay 18F15 directly operates the fives relay 18D2 and the reset relay 18D3 in order to effect the required overriding translation and to indicate to the concerned block coupler that the desired station is in the second group of stations on a line.

IIIC. *Terminal-pin blocks*

The terminal pins of Fig. 6 are shown as small individual circles. They preferably comprise terminal pins passing through blocks or a panel-like insulating member which may be mounted on the rear face of the equipment on which the relay apparatus of Fig. 6 is mounted. These pins provide terminals to which the noted overriding translation is controlled as desired by jumpers extending between the terminals as desired. Each terminal pin preferably extends directly through the rear of the face of the equipment to provide an exposed inner end to which a local cable conductor or a strap is attached, and an end exposed on the rear face of the equipment to receive a jumper.

There are twenty-one hundred terminal pins shown in Fig. 6. They comprise ten sections (1901 to 1910) of 210 pins each. In any section 1901 to 1910 the pins are arranged in ten columns, with 21 pins in a column, and in 21 levels, with 10 pins in a level. For ready identification the 21 levels of pins in a section are divided into four 5-level groups, 1 to 4, and a single-level group 5. The 210 pins of a section thus comprise four smaller groups of 50 each and one group of ten. The ten sections 1901 to 1910 are grouped generally into the following separate fields according to function as follows:

| | | |
|---|---|---|
| Sections | 1901 | Detector field. |
| | 1902 | |
| Sections | 1903 | Common field. |
| | 1904 | |
| | 1905, Groups 2, 3, and 4 | |
| Sections | 1905, Group 1 | Station-reset field. |
| | 1906, Group 1 | |
| Section | 1906, Groups, 2, 3, and 4 | Sleeve field. |
| Sections | 1907 | Reset field. |
| | 1908 | |
| | 1909 | |
| | 1910 | |

IIIC1. *The detector field*

Sections 1901 and 1902 of the terminal pins comprise the detector field. The one hundred terminals in groups 1 and 2 of section 1901 correspond respectively to registered hundred digits 0 to 9 and ten digits 0 to 9 and terminate one hundred wires 00 to 99.

The one hundred terminals in groups 3 and 4 of section 1901 correspond respectively to the registered unit digits 0 to 9 and station digits 0 to 9 and terminate 100 wires 00 to 99.

The one hundred terminals in the first ten levels comprising groups 1 and 2 of section 1902 are assigned respectively to registered unit digits 0 to 9 and terminates unit wires U0 to U9.

The one hundred terminals in the tens level in groups 3 and 4 of section 1902 are assigned respectively to registered station digits 0 to 9 and terminate station wires ST0 to ST9.

As hereinafter explained, the running of the two-wire detector jumper such as 1962 from the respective winding of a detector relay (such as 18E1 or 18D15) to terminals of the detector field corresponding to the hundreds and tens digits, and the units digits of a desired line number energizes both windings of that detector relay only when that line number is registered in the translator.

For station-transfer service, as will hereinafter be explained, the running of a two-wire detector jumper such as 1982 from the respective windings of a detector relay to terminals of the detector field corresponding to the hundreds and tens digits and the units and stations digits of a desired line number energizes both windings of that detector relay only when that line number is registered in the translator.

Connections to terminals in the detector field are made from any set of terminals D1 and D2 in the common field.

IIIC2. *The common field*

Sections 1903, 1904, and groups 2, 3, 4, and 5 of section 1905 of the terminal pins are called the common field because they contain terminals which are to be jumper-connected to the terminals of each of the other fields. The terminals of the common field comprise the following separate functional groups:

IIIC2a. *Common-number terminal group*

The first three five-level groups 1 to 3 in section 1903 are assigned respectively to the ten-trunk common-number groups termed P. B. X groups 1, 2, and 3. Each such 5-level terminal-pin group provides terminal points for the detector wires D1 and D2 of the assigned P. B. X groups and terminals pins P, F, U, and S (primary, fives, units, and sleeve) for each of the ten lines constituting the respective trunks of the group. Five-level group 4 in section 1903 accommodates the three-trunk common-number groups termed P. B. X groups 4 to 6 on columns 1 to 3, 4 to 6 and 7 to 9 respectively. Three-trunk groups P. B. X 7 to P. B. X 9 are similarly accommodated by the five-level group 1 of section 1904.

IIIC2*b*. *Number-transfer and number-intercept terminal groups*

Groups 2, 3, and 4, of sections 1904 and 1905 of the common field respectively accommodate wires connected with number-transfer relays 18E1 to 18F10. The five-level group 2 and two levels of group 3 in the common field, terminal section 1904 accommodates wires connected with number-transfer relays 18E1 to 18E10. The last two levels in group 3 of section 1904 together with the five-level group 4 accommodate wires connected with number-transfers relays 18E11 to 18E20. In section 1905, the five-level group 2 and the first two levels of group 3 accommodate the wires connected with number transfers relays 18E21 to 18E30. The last two levels in group 3 of section 1905 together with the five-level group 4 of the same section accommodate wires connected with number transfer relays 18F1 to 18F10. Translated-number terminals P, F, and U, reset terminal RS, stations terminal ST and detector terminals D1 and D2 are provided for each number-transfer relay.

Level 5 in sections 1902, 1903, 1904, 1905 and 1906 respectively accommodate line intercept wire L–INT, line transfer wire LT #1, line transfer wire LT #2, stations transfer wire ST #1 and stations transfer wire ST #2.

IIIC3. *The sleeve field*

The terminal pins comprising groups 2, 3, and 4 of section 1906 are referred to as the sleeve field because the first three levels in group 2, the first three levels in group 3, the last two levels in group 3 in addition to the first level of group 4, and the levels 2, 3, and 4 of group 4; serve as attachment points for thirty sleeve wires cabled between the block translator and the bunching block (not shown), on the corresponding line-link frames A to D. Thirty transfer sleeve wires for each line-link frame makes it possible to have as many as thirty lines on any line-link frame serving as trunks in common-number groups. Any such sleeve wire, before use in the translator, is jumpered (on the concerned line-link frame) to the sleeve wire of a desired line location thereon. In Fig. 6, this sleeve wire is jumpered to a desired sleeve terminal S of any desired group P. B. X. 1 to P. B. X. 9 in the common field. The first three sleeve wires S1 to S3 from line-link frame A are permanently wired, through wires in group PJ for the use of three lines of line-link frame A as a group of three intercept trunks leading to the switchboard of the intercept operator. If desired, only one or two of these lines are so used, in which case the unrequired sleeve jumpers are omitted.

IIIC3*a*. *Twenty-station relay control terminal group*

In group 2 of section 1906 in the sleeve field, levels 4 and 5 terminate wires used in controlling twenty-station relays 18D1 and 18D2 depending upon the number dialed and upon the presence of a strap between corresponding contacts of the two levels.

IIIC4. *The reset field*

The terminal pins in sections 1907, 1908, 1909 and 1910 are termed the reset field together with the noted stations reset levels in the first group of sections 1905 and 1906. These sections, with the exception of the station-reset terminal pins correspond respectively to line-link frames A, B, C, and D. In the reset field, the terminals in any level are strapped together to provide 10 equivalent multiple points for reset jumpers.

In any reset section 1907 to 1910, the first ten levels of terminal pins terminate a multiple of primary wires (P) outgoing to the associated line-link frame; the next five levels terminate a multiple of the five fives wires (F) outgoing to the line-link frame; and the final five levels in group 4 of each of the sections 1906 to 1910 terminate a multiple of the unit wires (U) outgoing to the line-link frame. The five levels in the first group of sections 1905 and 1906 terminate a multiple of stations wires (ST) associated with stations relays of the block translator relay section.

The terminals in the reset field in sections 1907 to 1910 receive three reset jumpers (such as 1954 and 1961) extending from any set of P, F, and U terminals in sections 1903, 1904, and 1905 of the common field.

The stations reset field in group 1 of sections 1905 and 1906 terminate a multiple of station wires ST–0 to ST–9 extending from the windings of the stations relays 18B1 to 18B10 over conductors in group RF5.

As described in the noted former application, the selected one of the stations wires extending from concerned block coupler to the stations relays in the translator receive ground on the stations lead (ST–1 to ST–0) corresponding to the setting of the stations register. This ground appearing on the windings of the stations relays also appear on the corresponding levels in the station reset field. Thus the grounding of any stations leads ST–1 to ST–10 extending to the block translator from the concerned block coupler place ground on the corresponding station reset level. The terminals in any level are strapped together to provide ten equivalent multiple points for station-reset jumpers.

IIID. *Operation for normal fixed translation*

The operation of the block translator on handling a call requiring only fixed translation is generally as described in the noted former application. Referring particularly to Fig. 5, parts 4 to 8, it will be observed that battery normally stands on the upper terminal of each of the hundreds, tens, units, and stations registers relays 18A1 to 18A10, 18A11 to 18A20, 18A21 to 18A30 and 18B1 to 18B10. The lower winding terminal of each of these relays serve as a termination point for a digit wire incoming from the block couplers. These digits wires comprise hundreds wires H1 to H10, tens wires T1 to T10, units wires U1 to U10 and stations wires ST1 to ST10. Any one of the noted register relays accordingly stands ready to be operated by a marking ground potential on its connected hundreds, tens, units, or stations digits wires.

IIID1. *Setting up the dialed number in the translator*

As described in the noted former application, when all the digits of a directory number have been registered and the terminating chain is idle, the concerned block coupler is associated with the block controller which causes the selected wire in each of the digits groups H, T, U, and ST to be grounded. The wires thus grounded correspond to the registered hundreds, tens, units, and stations digits. This marking ground on the four register-selected digits wires energizes the corresponding relay in the hundreds groups, tens group, the units group, and the stations group of the block translator.

IIID2. *Preliminary translation*

The noted ten wires in each of the four sets of digits wires extending from the block couplers 500 to the block translator are considered in the order of 1 to 10. As noted in the former application, the variance between the order of digits as dialed and the order of digits in a numbering plan of the lines and stations is taken care of in translator 1800 by a preliminary internal translating operation within and local to, each of the four digit group of wires brought into the translator. This preliminary translation associates the first register relay (relay 18A1 for the hundreds digits) to the digit-0 wire H10 which extends to the first register relay (18A1 for the hundreds digit) and the digit-1 to digit-9 wires extend respectively to the second to tenth ones of the associated registers relays (18A2 to 18A10 for the hundreds digits). In the view of this preliminary translation, the first five registers relays in any group of ten correspond respectively to the dialed digits 0 to 4 while the last five registers relays in the group correspond respectively to the dialed digits 5 to 9.

IIID3. *Operation of the translator relays*

Three sets of translators relays (Fig. 5, part 8) are employed to assist the digit-register relays 18A1 to 18A30 in setting up the translated equivalent of the hundreds, tens, and units digits of line numbers registered thereon. These sets of translator relays are:

*a.* Two fives relays 18B15 and 18B16;
*b.* Four twenty-fives relays 18B23 to 18B26; and
*c.* Four 250's relays 18B27 to 18B30.

As described in the noted former application, the fives translator relays 18B15 and 18B16 enable a decimal group of ten consecutive lines to be split into two groups of 5, to facilitate division of the lines of a hundred group into four groups of 25, and the division of a group of 25 into five groups of 5. Relay 18B15 accordingly, represents the first five lines (0 to 4) in a decimal group of ten, while relay 18B16 represents the second five lines (5 to 9) in a decimal group of ten.

The four 25's relays 18B23 to 18B26 respectively represent the four 25-line groups of consecutive numbers in any one of the ten hundreds groups. Relays 18B23 to 18B26 are controlled by the tens registers relays 18A11 to 18A20 together with the five translator relays 18B15 and 18B16. The operation of any of these relays indicates which group of twenty-five lines in the called hundred groups that the called line lies within.

Translator relays 18B27 to 18B30 correspond respectively to the four 250-line groups to which the numbers within the one thousand-line block of numbers are divided. Relays 18B27 to 18B30 are controlled by contacts of the hundreds registers relays 18A1 to 18A10, together with contacts of the twenty-fives relays 18B23 to 18B26.

IIID4. *Translated lines numbers*

As illustrated and described in the former application, each called line number has an equivalent translated number. Each translated number contains:

*a.* A primary digit from 1 to 0,
*b.* A fives digits from 1 to 5,
*c.* A units digits from 1 to 5.

The block translator secures the effect of prefixing the line-link frame designation A, B, C, or D to each of the two hundred and fifty translated equivalent line numbers. This prefixing effect is secured by transmitting any such line number over one of the four groups of digits wires 1841 to 1844 (part 8 of Fig. 5) which leads to the concerned frame A, B, C, or D. Each such group contains ten primary wires P, five fives wires F, and five units wires U.

The translated primary, fives, and units digits are as described in the noted former application.

IIID5. *The called line is number 111*

If, for example, the called line is number 111, the hundreds, tens, and units digits called are 1, 1, and 1. If so, the operated hundred, tens, and units register relays are the second hundreds relay 18A2, the second tens relay 18A12, and the second units relay 18A22. The first fives relay 18B15 is operated by contacts 4 of relay 18A22; the first 25's relay 18B23 is operated by contacts 13 of relay 18A12; and the first 250's relay 18B27 is operated by contacts 4 of hundreds relay 18A2.

IIID5*a*. *Translated primary digit 5 for frame A*

Contacts 2 of the second hundreds relay 18A2 ground hundreds wire 1 in group 1833. Ground on this wire is extended through contacts 2 of the operated 25's relay 18B23 to the fifth primary wire PA5 in group 1841 extending to line-link frame A.

IIID5*b*. *Translated five digit 3 for frame A*

With the second tens relay 18A12 and the first fives relay 18B15 operated, ground through contacts 11 of relay 18A12 is extended over wire 1 of group 1834 and thence through closed contacts 3 of the fives relay 18B15 to the third common fives wire 18F3. With the first 250's relay 18B27 operated, ground on this wire is extended through contacts 3 of relays 18B27 to fives wire FA3 in group 1841, extending to line-link frame A.

IIID5*c*. *Translated units digit 2 for frame A*

Contacts 3 of the second units relay 18A22 ground the second common units wire U2 in cable 1837 thereby grounding the units wire UA2 of line-link frame A through contacts 7 of the first 250's relays 18B27.

By the foregoing operation, the assumed registration of line no. 111 in the block translator results in the transmission of translated number 532 to line-link frame A.

IIID6. *Line controller response*

The line controller 1200 on line-link frame A responds, as described in the noted former application, to select the indicated primary switch in the indicated five groups thereon. The units digits of the translated number selects the called line 1 in the group of five. The line controller and line-controller switches route the call to the particular called line.

IIID7. *Clearing out*

When the operations necessary to extend the connection to the called line have been completed, the block controller initiates the clearing-out operation as described in the former application. The clearing-out of the block controller causes the block coupler to remove ground from the marked hundreds, tens, units and stations wires extending from the block translator. When this occurs, the operated digit-register relays in Fig. 5 restore and the other operated relays of the block translator responsively restore. The block translator is thereby cleared out and marking ground is removed from the translated-digit wires P1 to U5 extending to the called line-link frame.

IIIE. *General operation for overriding translation*

As previously noted, the block translator provides the following standard services by substituting overriding translation for the normal fixed translation for concerned called line numbers:

1. Group control twenty-station service.
2. Common-number service.
3. Line-number transfer service.
4. Station-number transfer service.
5. Line-intercept service.
6. Station-intercept service.
7. Individual control twenty-station service.
8. Station-transfer service for a twenty-station line.

IIIE1. *Detecting specific line and station numbers*

Common-number service, line-intercept service, and line-number transfer service, are given depending on a specific line number being registered in the translator 1800. Station-intercept service, station number-transfer service, and station transfer service for a twenty-station line are given depending on a specific line number and station being registered in the translator. The setting up of that line number or line number and station in the translator must be specifically detected to cause the normal fixed translation for that particular number to be superseded by pre-assigned overriding translation required according to the service assigned to the specific number.

The detecting operation is performed by individual detector relays separately assignable to desired numbers. The detector relays are:

1. 18E1 to 18F10 for line-intercept, station-intercept, line number transfer, station-number transfer, and a station transfer service for a twenty-station line; and 2. 18D15, 18D18 (not shown), 18D21 and 18D24 to 18D29 for common-number service.

Each detector relay has two windings, as shown, and is adjusted to operate only if both windings are energized. For each detector relay, these windings are wired to separate detector terminals D1 and D2 in the common field, terminal pin sections 1903, 1904, and 1905 of Fig. 6. To prepare a detector relay to detect a specific called number, a two-conductor jumper is run from its terminal pins D1 and D2 to carry the winding terminals of the detector relay to two terminal pins in the detector field, section 1901 and section 1902 of Fig. 6. One such terminal pin is a hundreds and tens pin in groups 1 and 2 of section 1901 and the other may be a units and stations pin in group 3 and 4 of section 1901 or a single units pin in groups 1 and 2 of section 1902.

Ground appears on both such terminals pins only when a specific number is called. The concerned detector relay then operates as both its windings are energized, each over a separate wire of the noted detector jumper. Jumper 1982, 1962, and 1951 are three examples of the noted two-wire detector jumpers.

A hundreds relay 18A1 to 18A10, at its contacts 1 together with contacts 1 to 10 of tens relays 18A11 to 18A20 cooperate to control the one hundreds and tens wires 00 to 99 in group DF1. The one which corresponds to the registered combination of the hundreds and tens digits is grounded through contacts 1 of the operated hundred register relay, over the concerned wire 0 to 9 in the group 1882, and a contact 1 to 10 of the operated tens relay 18A11 to 18A20. These one hundred hundreds and tens wires extend to their respective terminals in groups 1 and 2 (levels 1 to 10) of the detector field, section 1901 over group DF1.

Contacts 2 of units relays 18A21 to 18A30 and contacts 1 to 10 of stations relays 18B1 to 18B10 cooperate to control one hundred units and stations wires 00 to 99 in group DF2. The one which corresponds to the registered combination of units and stations digit is grounded through contacts 2 of the operated units register relay, over the concerned wire 0 to 9 in the group 1883, and a contact 1 to 10 of the operated stations relay 18B1 to 18B10. These one hundred units and stations wires extend to their respective terminals in groups 3 and 4 (levels 11 to 20) of the detector field section 1901 over group DF2.

Units relays 18A21 to 18A30, at contacts 1 respectively ground the units wires U0 to U9 in group DF3. These wires extend to the detector field section 1902 and are strapped across the first ten levels respectively. These levels thus comprise units detector bus bars.

Stations relays 18B1 to 18B10, at contacts 11 extend battery through the winding of intercept control relay 18F16 over conductor 1884 to respective stations-intercept wires STI–0 to STI–9 in group DF4. These wires extend to the detector field section 1902 and are strapped across the first ten levels respectively in groups 3 and 4. These levels thus comprise the stations-intercept bus bars.

Battery through the winding of intercept-control relay 18F16 is also placed to the detector field independent of contacts on the stations relays, to provide line-intercept service. This lead is designated L-INT in group RF4 and is connected to level 21 of group 5 in section 1902. This lead is strapped across the terminals pins in this level and comprise the line-intercept bus bar.

The ten terminal pins in each group 5 of sections 1902 to 1906 are strapped together to form five bus bars, respectively termed line-intercept, line-transfer #1, line-transfer #2, stations-transfer #1, and stations-transfer #2 bus bars.

Wires LT–1, LT–2, STT–1, and STT–2 in group CF11 are connected to the respective line-transfer #1, line transfer #2, station transfer #1, and stations transfer

#2 bus bars. A single wire, L-INT is connected to the line-intercept bus bar as previously noted.

A ground appearing on the line-transfer #1 bus bar causes relay 18D3 to operate in order to provide overriding translation, ground on line-transfer #2 bus bar causes relay 18F15 and relay 18D3 to operate, ground appearing on station-transfer #1 bus bar causes relay 18F14 and relay 18D3 to operate, and ground appearing on station-transfer #2 bus bar causes relays 18F14, 18F15 and 18B3 to operate. The functions performed by the operation of these relays will be hereinafter described.

IIIF. *Group control twenty-station service*

As described in the noted former application, group control or normal twenty-station service is limited to the lines in the fourth fives group of any primary switch on line-link frame A. The assigning of a primary switch to group control twenty-station service is accomplished by connecting a vertical strap 1960 (Group 2, Section 1906, Fig. 6) between the corresponding pins in levels 4 and 5. The illustrated vertical straps 1960 assign primary switches 2, 3, and 4 to normal twenty-station service.

IIIF1. *Group control twenty-station primary detection*

With straps 1960 installed as illustrated, when a call is directed to one of the associated primary switches 2, 3, and 4 on line-link frame A, the consequent translation ground on primary wire PA2 to PA4, closes a circuit over the corresponding wire in group 1915, concerned strap 1960, wire 2, 3, or 4 in the group SF2, and through a resistor 1801 to primary relay 18D1 through break contacts 7 of reset relay 18D3. Primary relay 18D1 thereupon operates as an indication that the called line is served by a primary switch which has been assigned to twenty-station service.

IIIF2. *Group control twenty-station fives detection*

As described in the noted former application, if the called number is one of the last five line numbers assigned to the concerned primary switch, the fifth common fives wire 18F5 becomes grounded operating relay 18D2. At its contacts 4, relay 18D2 grounds code-control wire CC to notify the concerned block coupler that a twenty-station line has been called. This, together with the ground on ring-reverse wire RR–1 or RR–2 (contacts 5 of relay 18D2) causes the concerned block coupler to signal the corresponding station in the second group of ten on the called line as will hereinafter be described. At its break contacts 1 and 2, relay 18D2 cancels the normal fixed fives translation.

IIIG. *Common-number service*

As previously pointed out, the group allotter (relays 18D5 to 18D14) is controlled by the relays of groups P. B. X1 to P. B. X9 (relays 18D15 to 18D29) to provide common-number, or P. B. X service.

The making up of a common-number of P. B. X group, is as illustrated and described in the noted former application, and the noted relays operate as described therein when any such group is called.

IIIH. *Line-number transfer service*

As pointed out in the noted former application, it may be desirable to transfer some high-traffic lines to spare line locations or other line-link primary switches. Such a transfer would normally require a change in the directory number of the transferred lines. Since such changes are bothersome to the operating company and to the subscriber, the block translator is arranged to provide overriding translation to perform line-number transfer service which enables any transferred line to retain its original directory number.

IIIH1. *Line-number transfer relay assignment*

When line-number transfer service is to be applied to a transferred line, an available one of the forty number-transfer relays 18E1 to 18F10 is assigned to the transferred line. A two-wire line-detecting jumper such as 1962, a three-wire reset jumper such as 1961, and a one-wire service jumper such as 1963 are installed as illustrated for the first number-transfer relay 18E1.

IIIH1*a*. *Detector jumper 1962*

If, for example, line-number transfer service is to be provided for line No. 512, number-transfer relay 18E1, if available, may be assigned to that line-number.

The pin-terminal location for number-transfer relay 18E1 lies in the common field, section 1904, column 1, levels 6 through 12. The pins in the first column of levels 11 and 12 (opposite D1 and D2) are the detector terminals. A two-wire detector jumper such as 1962 is run from these pins to the terminal pins in the detector field representing line No. 512, the directory number of the transferred line.

The hundreds digit 5 and the tens digit 1 are detected by connecting wire D1 of jumper 1962, as shown in Fig. 6, to the terminal pin in level 5, column 1, of section 1901 of the detector field. The units digit 2 is detected by connecting wire D2 of jumper 1962 to any terminal pin in level U2 of section 1902.

IIIH1*b*. *Reset jumper 1961*

If line No. 512 is transferred to line No. 460, as described with noted former application, the switchboard location of the transferred line is in frame B, the ninth primary switch, and the first line in the third fives group.

This required overriding translation (B931) is assigned to number-transfer relay 18E1 by running the three-wire reset jumper 1961 between the P, F, and U pins (levels 5 to 7, colmn 1 of section 1904) and the required reset P, F, and U pins levels in section 1908 of the reset field. Wire P is connected to level PB9, wire F is connected to level FB3 and wire U is connected to pin in level UB1.

IIIH1*c*. *Service jumper 1963*

In order to determine the type of special service demanded of a number-transfer relay, a service jumper such as 1963 is installed as shown. The terminal pin RS, located in level 9, column 1, of section 1904, is connected to any pin of the line transfer #1 bus bar to cause the operation of number-transfer relay 18E1 to effect line-number transfer service.

IIIH2. *Line-number-transfer operation*

With the noted jumpers 1961, 1962, and 1963 installed for the first number-transfer relay 18E1, the consequent registration of the hundreds, tens, and units digits 5, 1, and 2 in the translator causes number-transfer relay 18E1 to operate as follows:

IIIH*a*. *Detection*

Registration of hundreds digit 5 and tens digit 1 in the translator 1800 causes ground to be extended from contacts 1 of hundreds relay 18A6, over wire 5 in group 1882, through contacts 5 of tens relay 18A2, and over wire 1 in group DF1 to the hundreds and tens terminal pin 51 in the detector field. This ground is further extended over wire D1 of the attached jumper 1962, the concerned pin D1 in section 1904, and the associated conductor in sub-group 1 of group CF10 to the lower winding of detector relay 18E1. At the same time, registration of units digit 2 causes ground to be extended from contacts 1 of units relay 18A23 over wire 2 in group DF3, to the units bus bar U2 in the detector field (section 1902). This ground is further extended over wire D2 of the connected jumper 1962, the concerned pin D2, and the associated conductor in sub-group 1 of group CF10 to the upper winding of detector relay 18E1.

IIIH2*b*. *Resetting*

Relay 18E1, which will not operate when only one winding is energized, now operates because both windings are energized. Its contacts 1 to 3 connect the associated wires P, F, and U in group CF10 to the corresponding wires in group 1804, through which number-transfer overriding translation is controlled. Wires 1804 are common to the forty number-transfer relays 18E1 to 18F10. They comprise the normal extension wires 1803 which originate at the open front contacts of reset relay 18D3. The predetermined overriding translation is withheld until the normal fixed translation has been erased. Resistors 1895 are of such a value that they are ineffective to cause overriding translation, but are effective to operate intercept-control relay 18F16 as will hereinafter be described.

Contacts 4 of detector relay 18E1 places ground on wire RS in group CF10 to its associated RS terminal in section 1904 of the common field. This ground is extended over jumper 1963 to line-transfer #1 bus bar, which as previously pointed out is connected to battery through the winding of reset relay 18D3 by way of wire LT–1 in group CF11. Reset relay 18D3 thereupon operates from the ground at contacts 4 of relay 18E1. Its contacts disconnect ground from wires P, F, and U in group 1831, thereby removing ground from contacts 2 of the hundreds relays, contacts 11 of the tens relays, and contacts 3 of the units relays, thereby cancelling the normal fixed translation (C133) for the called line number 512, by removing ground from the connected primary, fives, and units wires in group 1843. Make contacts of reset relay 18D3 extend ground over wires in group 1803 and through break contacts 1 to 3 of the unoperated reset relay 18D4, to the overriding translation common wires P, F, and U in group 1804. Reset ground is thereby extended through contacts 1 to 3 of relay 18E1, over wires P, F, and U in sub-group 1 of group CF10 and the connected terminal pins P, F, and U in the common field, to respective conductors in the three-wire reset jumper 1961. Ground over jumper 1961 is thereby extended to wires PB9, FB3, and UB1 in group RF2, multiplied to the corresponding wires in the frame B, group 1842. Overriding translation G931 is thus substituted for the normal fixed translation C133. Contacts 7, of reset relay 18D3 opens the operate circuit of twenty-station primary relay 18D1. Contacts 5 of detector relay 18E1 closes wire ST in sub-group 1 of group CF10 to wire 1891 extending to stop relay 18F13. Wire ST is ineffective as no jumper is connected to the corresponding terminal in the common field.

IIIH2*c*. *Line-controller response*

The line controller 1200 on line-link frame C, which has no more than barely started to position the associated line-controller switches for the normal fixed translation C133, is released responsive to the described cancellation of the normal fixed translation by reset relay 18D3. The line controller 1200 on line-link frame B is then activated by the overriding translation.

When the overriding translation is for the same line-link frame as the cancelled normal fixed translation, the relay groups comprising the digits registered in the concerned line controller clear out when 18D3 operates as described and are immediately reset by the overriding translated number. When the ensuing operations have been completed, restoration of the hundreds, tens, and units register relays of block translater 1800 restore detector 18E1, which restores reset relay 18D3.

IIIH2*d*. *Freeing a number-transfer relay*

If a directory-number change is later made (as upon the issuance of a new directory), or if the normal turnover and reassignment of lines permit the noted transferred line 512 to be transferred back to its original switchboard location, the concerned number-transfer jumpers 1961, 1962, and 1963 are removed, freeing the associated number-transfer relay 18E1 for assignment for other services.

IIIJ. *Station-number transfer service*

The block translator is arranged to provide overriding translation for performing station-number transfer service which enables any station on any line to be moved to any station location on another line and yet retain the original directory number.

IIIJ1. *Station-number transfer relay assignment*

When station-number transfer service is to be applied to a transferred station (to permit the noted retention of its old directory number) an available one of the forty number-transfer relays 18E1 to 18F10 is assigned to the transferred station. A two-wire line-detecting jumper such as 1982, a three-wire reset jumper such as 1981 and two one-wire service jumpers such a 1983 and 1984 are installed as illustrated in Fig. 6 for the number-transfer relay 18F3 (not shown), the thirty-third relay of the forty number-transfer relays 18E1 to 18F10.

Relay 18F3 (not shown) is the same as number-transfer relays 18E1 and 18F10 illustrated in Fig. 5, part 1.

IIIJ1*a*. *Detector jumper 1982*

If, for example, station-number transfer service is to be provided for a transferred station such as a station represented by the digit 9 on line 687, number-transfer relay 18F3, if available, may be assigned to number 6879 the original directory number of the transferred station.

The pin-terminal location for number-transfer relay 19F3 lies in the common field, section 1905, column 3, levels 14 through 20. The pins in the third column of levels 14 and 15 (opposite D1 and D2) are the detector terminals for that particular relay. A two-wire detector jumper such as 1982 is run from these pins to the terminal pins in the detector field representing the directory number 6879.

The hundreds digit 6 and tens digit 8 are detected by connecting wire D1 of jumper 1982, as shown in Fig. 6, to the terminal pin in level 6, column 9 of section 1901 of the detector field. The units digit 7 and the stations digit 9 is detected by connecting wire D2 of jumper 1982 to the terminal pin in level 18, column 10, of section 1901 of the detector field.

IIIJ1*b*. *Reset jumper 1981*

If the station on line 687, represented by the station digit 9, is transferred to the station on line 460 represented by the digit 4, the overriding translation B931 (the translated equivalent of line 460 as illustrated in the noted former application) is assigned to number-transfer relay 18F3 by running a three-wire reset jumper such as 1981 from the P, F, and U pin-terminals (levels 16 to 18, column 3 of section 1905) to the reset P, F, and U levels in the reset field representing the translated equivalent of line 460.

IIIJ1*c*. *Service jumpers 1983 and 1984*

As previously noted, the special service jumpers determine the type of special service demanded of a number-transfer relay. The terminal pin RS, located in level 19, column 3, of section 1905 is connected to any pin of the station-transfer #1 bus bar (level 21 of section 1905) by jumper 1983, to cause the operation of number-transfer relay 19F3 to effect station-number transfer service. Another special service jumper 1984 is connected between terminal pin ST (level 20, column 3 of section 1905) and the bus bar in the station-reset field (levels 1 to 5 of sections 1905 and 1906) which corresponds to the digit representing the location of the transferred station on the new line. For instance, if the transferred station has the same location that it had on line 687, jumper 1984 is connected to bus bar ST9. If the transferred station has a station location represented by the station digit 4, jumper 1984 is connected to bus bar ST4 as shown.

IIIJ2. *Station-number transfer operation*

With the noted jumpers 1981, 1982, 1983, and 1984 installed for the thirty-third number-transfer relay 18F3, the consequent registration of the hundreds, tens, units, and stations digits 6, 8, 7, and 9 respectively in the translator causes number-transfer relay 18F3 to operate.

IIIJ2*a*. *Detection*

Registration of hundreds digit 6 and tens digit 8 in the translator 1800 causes ground to be extended to the hundreds and tens terminal pin 68 in the detector field in the manner described under Line-Number Transfer Service. This ground is further extended over wire D1 of the attached jumper 1982, the concerned pin D1 in section 1905, and the associated conductor in sub group 33 (not shown) of group CF10 to the lower winding of the number-transfer relay assigned to station-number transfer service. At the same time, registration of units digit 7 and stations digit 9 causes ground to be extended from contacts 2 of units relay 18A29 over wire 8 in group 1883, through contacts 9 of stations relay 18B10, and over wire 9 in group DF2 to the units and stations terminal pin 79 in the detector field. This ground is further extended over wire D2 of attached jumper 1982, the concerned pin D2, the associated conductor in sub-group 33 (not shown) of group CF10 to the upper winding of the noted associated number-transfer relay.

IIIJ2*b*. *Resetting*

As previously noted, when both windings of any number-transfer relay are energized, the number-transfer relay will operate. Relay 18F3 therefore operates, and at its contacts 1 to 3 connect the associated wires P, F, and U in group CF10 to the corresponding wires in group 1804, through which, as previously described, number-transfer overriding translation is controlled. Contacts 4 of number-transfer relay 18F3 places ground on wire RS in group CF10, which is extended to its associated RS terminal in the common field. This ground is extended over jumper 1983 to Stations Transfer #1 bus bar which, as previously pointed out, is connected to battery through the winding of start relay 18F14 by way of wire STT–1 in group CF11. Start relay 18F14 thereupon operates from the ground at contacts 4 of the number-transfer relay in use. Its contacts 2 cause the operation of reset relay 18D3 which, as previously described, cancels the normal fixed translation and grounds the overriding translation common wires P, F, and U in group 1804. Reset ground is thereby extended through contacts 1 to 3 of the operated number-transfer relay, over wires P, F, and U in group CF10 and the connected terminal pins P, F, and U in the common field, to respective conductors in the three-wire reset jumper 1981. The ground on this jumper is thereby extended to a primary wire, a five wire and the units wire in the reset field which corresponds to the overriding translation which is substituted for the normal fixed translation.

In addition to effecting the operation of the reset relay 18D3 to provide overriding translation, start relay 18F14 resets the stations register in the concerned calling block coupler as follows:

IIIJ2*c*. *Resetting the stations register in the block coupler*

Assuming that the transferred station has a new station location on the new line, it is necessary to reset the stations register to provide the correct station ring. This is accomplished by releasing the stations register SR (Fig. 2) in the concerned block coupler and then resetting it according to the new location of the transferred station.

Contacts 3 of start relay 18F14 place ground on the windings of relays 18F11 and 18F12 at the same time.

The operate path of relay 18F11 is through break contacts 3 on relay 18F12 which is indicated, is a slow operate relay. Consequently relay 18F11 will operate and remain operated until the slow-operate relay 18F12 operates.

As disclosed in my application, for a Block Coupler, Serial No. 190,030, filed October 13, 1950 wire ST-RE extending to block translator 1800 maintains stations register counter SR operated as long as the concerned block coupler is individual to the block translator.

Figure 2:
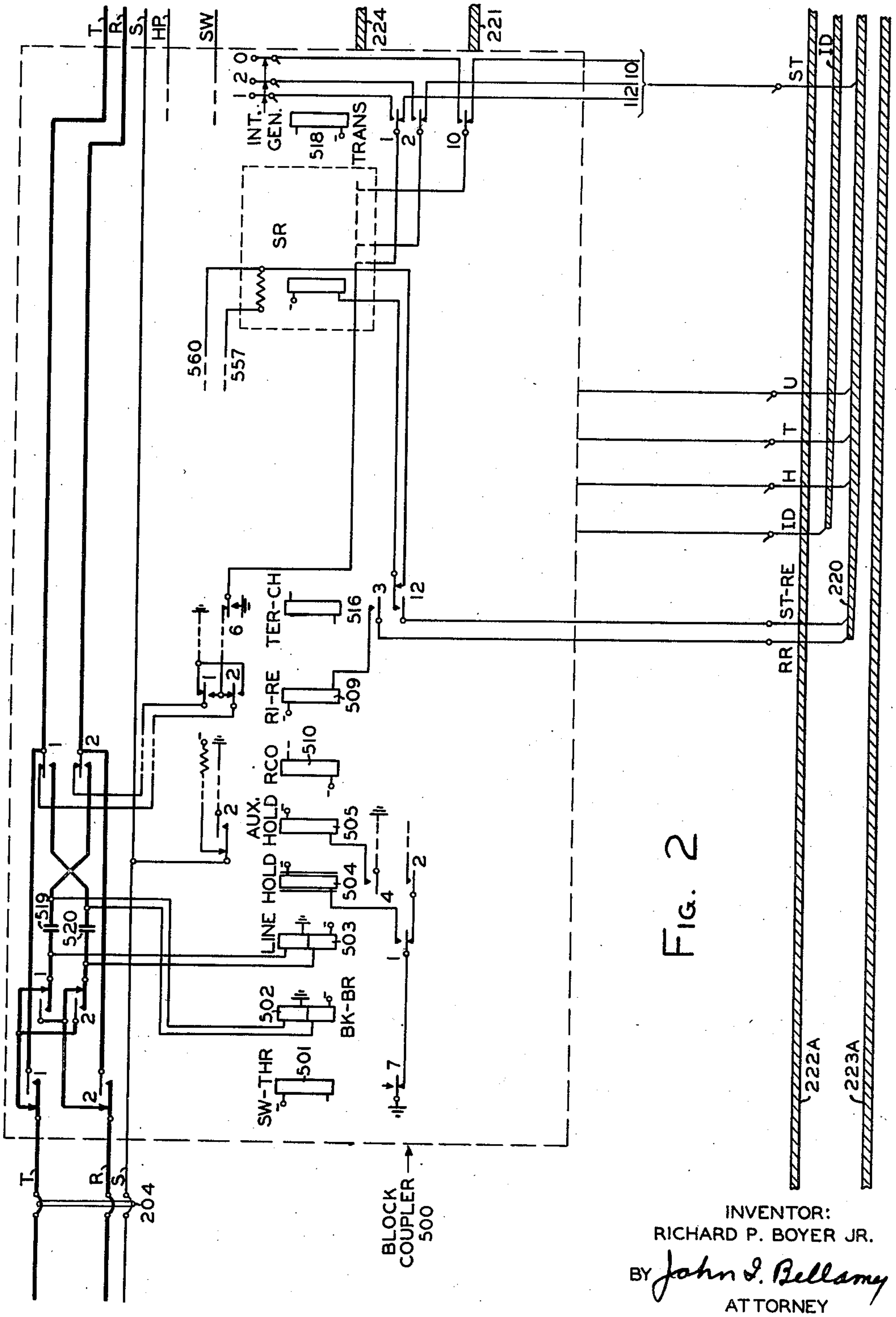

Referring now in particular to Fig. 2 and Part 1 of Fig. 5, it will be observed that ground through resistor 1896 is present on wire ST-RE through break contacts 1 of relay 18P11. This ground is extended over wire ST-RE and through make contacts 12 of relay 516 (as described in the noted Boyer application, relay 516 and stations register SR are operated while the block coupler is individual to the block translator) to the winding of stations register SR, maintaining it in its originally-dialed position.

Ground from make contact 6 of operated relay 516 is extended through contacts on register SR and over the digit-selected station wire extending to the block translator to operate the selected one of the stations relay 18B1 to 18B10.

Contacts 1 of relay 18F11 remove wire ST-RE from its holding ground (ground through resistance 1896) and place it on condenser 1897 which is normally charged by battery through resistance 1898 and ground from break contacts 3. Contacts 1, 2, and 3 of relay 18F11 cause a reversal of current flow over wire ST-RE which, as described in the noted Boyer application, causes the stations register in the concerned block coupler to release.

With stations register SR (Fig. 2) released, the ground on the selected stations wire extending to the block translator is removed, releasing the associated stations relay and removing the ground from the wires in group RF5 extending to the stations-reset bus bars in Fig. 6.

After a slight delay, due to the slow-operate characteristics of relay 18F12, relay 18F12 operates and at its contacts 3 releases relay 18F11. Relay 18F12 remains locked operated at contacts 3 of relay 18F14. Its contacts 2 ground the start wire of interrupter 1899 (which is shown as a cam-type interrupter) which delivers a series of ground impulses of a predetermined pulsing frequency.

The release of relay 18F11, responsive to the operation of relay 18F12, transfers station-reset wire ST-RE back to ground through resistance 1896 and to the pulsing ground from interrupter 1899. This pulsing ground is placed on wire ST-RE through break contacts 1 of relay 18F13, and through make contacts 1 of release-timer relay 18F12. These ground impulses are delivered to the winding of the stations register in the concerned block coupler and as pointed out in the noted Boyer application, cause the station register to advance step-by-step.

As the stations register in the concerned block coupler is being reset responsive to the interrupted pulses being received over wire ST-RE, the contacts on the stations registers SR will place ground on the stations leads ST1 to ST10 extending to the stations relays in the block translator (Fig. 5 Part 7). This marking ground will cause stations relays 18B1 to 18B10 to operate in sequence according to the step-by-step operation of the stations register in the block coupler. The operating ground for these relays is extended over group RF5 to corresponding station reset bus bars (sections 1905 and 1906 of pin terminal section of Fig. 6).

As pointed out, service jumper 1984 is connected between the stations-reset bus-bar #2 and the ST terminal in the common field which corresponds to the number-transfer relay assigned for station-number transfer service.

When the stations register in the concerned block coupler places ground on station lead ST–1, ground will also appear on the station-reset bus bar #1. The next operation of the stations register removes ground from station lead ST–1 and grounds lead ST–2. The third operation of register SR grounds lead ST–3 and removes ground from station lead ST–2. These grounds are extended over wires in group RF5 to associated stations-reset bus bars. When the stations register in the concerned block coupler operates on the fourth pulse of ground from interrupter 1899, ground appears on station-reset bus bar #4 and is further extended over service jumper 1984 to the concerned terminal pin ST. This ground is extended through contacts 5 of the operated number-transfer relay and through the winding of start relay 18F13 to wire ST-RE.

At this particular moment, ground from interrupter 1899 and ground extending from the concerned stations reset bus bar is placed on wire ST-RE, shunting relay 18F13. When the cam of interrupter 1899 removes the noted pulsing ground, the ground on station-reset bus bar #4 being present on wire ST-RE prevents further operation of the stations register in the concerned block coupler. The current flow over wire ST-RE, passing through the upper winding of relay 18F13 causes it to operate. Relay 18F13 lock through its contact 3 and its lower winding and at its contacts 1 open the pulsing circuit of wire ST-RE. The wire ST-RE now maintains the stations register in its operated position by the ground through resistance 1896 as previously pointed out.

The stations register in the concerned block coupler is now reset according to the new station location of the transferred station.

IIIJ2*d. Block controller response*

With the ground from the stations-reset bus bar appearing on wire ST-RE together with the ground from the cam of interrupter 1899, the possibility of an extraneous pulse being transmitted over wire ST-RE when the required number of pulses have been delivered is eliminated, hence the speed which the pulses are delivered may be greatly increased. Since the resetting of the station register consumes time regardless, it is important that the common equipment is prevented from completing its normal functions, such as matching and switching-through, until the stations register is properly reset. Contacts 1 of start relay 18F14 together with break contacts 2 of stop relay 18F13 place a ground on control-hold wire CH extending to the block controller. As illustrated in Fig. 3, this CH wire extends to relay 16A21. Relay 16A21 operates and at its break contacts opens the operate circuit of operate relay 16A14. The switching-through and clearing-out of the common equipment is thereby delayed until the stations registers is properly reset.

When the resetting of the station register is completed, stop relay 18F13 thereupon operates as noted and at its break contacts 2 remove the ground from the control-hold wire CH which releases hold relay 16A21 (Fig. 3). The release of relay 16A21 closes the operating circuit of relay 16A20 thereby permitting the switching-through and clearing-out in the normal manner.

IIIJ2*e. Station-number transfer service without station register reset*

If the station location of a transferred station is the same as its station location before it was transferred, it is possible to effect the overriding translation without resetting the stations register of the concerned block coupler. This may be accomplished by connecting the concerned number-transfer relay for line-number transfer service with the exception of the detector jumper.

A number-transfer relay connected for line-transfer service operates on completion of the dialing of the units digit and consequently all stations on the detected line are transferred. Since only the transferred station is to be detected, the hundreds and tens terminal pin and the units and stations terminal pin are connected to the winding of the number-transfer relay.

When the line to be detected is dialed, the block translator upon receipt of the hundreds, tens, units, and stations digits operates the associated number-transfer relay which cancels the normal fixed translation by the operation of reset relay 18D3 independent of the operation of relay 18F14 (the stations-register-reset start relay). The contacts on the number-transfer relay performs the same functions as when connected for station-number transfer service except for wire ST which has no jumper connected to it.

IIIJ2*f*. *Line controller response*

The response of the line controllers 1200 on the line-link frame corresponding to the directory number and the translated number responds as described for line-number transfer service.

When the overriding translation has been completed, the restoration of the hundreds, tens, units, and stations register relays of the block translator 1800 restore all operated relays, clearing-out the common equipment.

IIIJ2*g*. *Freeing a number transfer relay*

As previously pointed out, if directory-number changes are later made, the concerned jumpers may be removed, freeing the associated number-transfer relays for assignment for other services.

IIIJ2*h*. *Intra-line station-number transfer*

It may be desirable to provide a service which enables any station on any line to be moved to another location on the same line. For example, on a code-ringing party line, if a vacancy occurs, it may be filled by any station on that line which receives the new code ring and yet retains the old directory number. The block translator has been arranged to provide this intra-line station-transfer service by means of jumpers on the pin-terminal sections.

As previously pointed out, any station on any line may be transferred to any location on any other line by connecting the proper jumpers. If the three-wire reset jumper were connected to the primary, fives, and units bus bars in the reset field which correspond to the translated equivalent of the line being detected, the consequent overriding translations would be the same as the normal fixed translation. Therefore, the running of the normal jumpers for station-number transfer service, with the reset jumper causing the overriding translation to be the same as the normal fixed translation, the stations register in the concerned block coupler would be reset according to the new station-location as previously described and the overriding translation would direct the call to the line that it detected.

It has been contemplated to arrange the pin-terminal section and the block translator for intra-line station transfer services without overriding translation but since the apparent demand for such a service is small and since the available terminals in the reset field of section 1907 to 1910 permit a greater number of jumpers than necessary, it was deemed advisable to utilize the reset jumpers for causing the overriding translation to be the same as the normal fixed translation.

IIIK. *Number-intercept service*

As previously pointed out, number-intercept service is provided by block translator 1800 by providing overriding intercepting translation on calls for disconnected lines or stations, to reroute such calls to an intercept operator. Up to 40 separate lines can be placed on intercept service by assigning number-transfer relays 18E1 to 18F10 respectively to them. Each number-transfer relay assigned to any line for intercept purposes can intercept as many as four stations on that one line. Intercept-call-in relay 18D30, and the intercept-control relay 18F16 are controlled by any one of the noted number-transfer relays by the installation of proper jumpers in the pin terminal section of Fig. 6. Operation of call-in relay 18D30 calls in three intercept trunks for test by the P. B. X allotter.

IIIK1. *Intercept-relay assignment*

When number-intercept service is to be applied to a line, an available one of the forty number-transfer relays 18E1 to 18F10 is assigned thereto, and the proper jumpers are installed for the number-transfer relay chosen for intercept purposes.

IIIK2. *Line-intercept service*

If, for example, intercept service is to be provided for line No. 512, number-transfer relay 18E13, if available, may be assigned to this line number.

If line 512, to which number-transfer relay 18E13 is assigned, is an individual line, all calls thereto are to be intercepted. In this event, it is necessary to detect only the hundreds, tens, and units digit.

IIIK2*a*. *Detector jumper 1942*

The pin-terminal location for number-transfer relay 18E13 lies in the common field, section 1904, column 3 of levels 14 through 20. The pins in the third column of levels 14 and 15 (opposite D1 and D2) are the detector terminals for this particular relay. A two-wire detector jumper such as 1942 is run from these pins to the terminal pins in the detector field representing line No. 512. With this two-wire detector jumper installed, as explained for number-tranfer relay 18E1, jumper 1962, and line-number 512, the number-transfer relay assigned thereto operates subject to line No. 512 being registered in the translator.

IIIK2*b*. *Special-service jumper 1943*

As hereinbefore noted, the type of service demanded of the number-transfer relay is determined by the special service jumper. As illustrated, jumper 1943 is connected between the RS terminal associated with number-transfer relay 18E13 and the line intercept bus bar, level 21 of section 1902. As described, the line-intercept bus bar is connected to battery through the winding of intercept-control relay 18F16 by way of conductor L-INT in group DF4.

IIIK3. *Line-intercept relay operation*

With the noted jumpers 1942 and 1943 installed for the thirteenth number-transfer relay 18E13, the consequent registration of the hundreds, tens, and units digits 5, 1, and 2, respectively, in the translator, independent of the stations relay operated, causes number-transfer relay 18E13 to operate, as explained for the operation of number-transfer relay 18E1.

IIIK3*a*. *Detecting*

Number-transfer relay 18E13, now operates because both windings are energized. Its contacts 4 place ground on conductor RS in group CF10 which is extended to its associated terminal pin RS in the common field. This ground is further extended over the noted jumper 1943 and over the associated conductor L-INT in group DF4 to battery through the winding of intercept-control relay 18F16, operating it.

The intercepting service performed by the operation of relay 18F16 will be hereinafter described.

IIIK4. *Station-intercept service*

If line No. 512 is a multi-station line from which one or more stations have been disconnected, only the calls to these particular stations are to be intercepted. In this event, it is necessary to detect the particular stations digit dialed in addition to detecting the hundreds, tens, and units digits.

One or more of these disconnected stations may be placed on intercept by the running of the proper jumpers between terminal pins of P, F, U, and RS of the number-transfer relay assigned for intercept service and the stations-intercept bus bars corresponding to the stations digits of the disconnected stations to be intercepted.

IIIK4*a*. *Detector jumper 1932*

If for example, intercept service is to be provided for the station corresponding to the digit 0 on line No. 512, number-transfer 18E10, if available, may be assigned to this line number.

The pin terminal location for number-transfer relay 18E10 lies in the common field, section 1904, column 10 of levels 6 to 12. The pins in the tenth column of levels 6 and 7 (opposite D1 and D2) are the detector terminals for this particular relay. A two-wire detector jumper 1932 (similar to jumper 1942) is run from these pins to the terminal pins in a detector field representing line No. 512. When line No. 512 is registered in the translator, relay 18E10 will operate in the manner described for number-transfer relay 18E1, jumper 1962, and line 512.

IIIK4*b*. *Service jumpers 1931A to 1931D*

If line 512, to which number-transfer relay 18E10 has been assigned by jumper 1932 is a multi-station line from which a specific station has been disconnected, one of the terminal pins, P, F, U, and RS corresponding to the noted number-transfer relay is connected to the stations-intercept bus bar corresponding to the station digit of the disconnected station. For example, if the station on line 512 corresponding to the digit 0 is to be intercepted, a jumper such as 1931A is connected between a terminal pin such as P of the associated number-transfer relay and the stations intercept bus bar STI–0.

As previously pointed out, the station-intercept bus bars of the detector field are connected to battery through the winding of intercept-control relay 18F16 and through contacts 11 of the respective stations relays in block translator 1800.

With jumpers 1931A and 1932 in place, relay 18E10 operates whenever line No. 512 is registered, but without effect except when stations digit 0 is registered in translator 1800 to operate stations relay 18B1, which at its contacts 11, connect wire STI–0 to wire 1884 and thence the winding of intercept-control relay 18F12.

If two disconnected stations on the same line are on intercept service, any two of the terminal pins P, F, U, and RS associated with number-transfer relay 18E10 are connected by means of jumpers, such as the 1931A and 1931B, to the stations-intercept bus bars corresponding to the station digits of the disconnected stations. Similarly four disconnected stations on one line may be intercepted by connecting jumpers such as 1931A, 1931B, 1931C and 1931D, between the four noted terminal pins and the stations-intercept bus bars corresponding to the stations digits of the disconnected stations.

IIIK5. *Station-intercept relay operation*

With the noted jumper 1932 installed for the tenth number-transfer relay 18E10, the consequent registration of hundreds, tens, and units digits 5, 1, and 2, respectively in a translator energizes the number-transfer relay 18E10 in the manner previously described.

IIIK5*a*. *Detecting*

Number-transfer relay 18E10, now operates because both its windings are energized by the grounding of the associated detector terminals, responsive to the registration of the number 512 in the block translator. Contacts 1 to 3 of relay 18E10 (not shown) place ground through resistances 1895 on conductors, P, F, and U, and at its contacts 4 place a solid ground on conductor RS. These grounds are extended to the associated terminal pins P, F, U, and RS in the common field and then over the noted jumpers 1931A, 1931B, 1931C and 1931D, the associated conductors in group RF4 (associated with the stations-intercept bus bar connected to these jumpers), to contacts 11 of the associated stations relay in translator 1800.

With the registration of line No. 512 in the translator, ground will appear on all four of the above noted conductors as described. The stations digit determines which one of the stations relay is operated, hence, the conductor associated with this operated relay is the only one that will place ground on the winding of the intercept-control relay. Therefore, if the stations digit dialed does not correspond to the station to be intercepted, the ground on the noted jumpers are ineffective. If the stations digit dialed is one corresponding to the disconnected station, ground from one of the four noted jumpers is placed through contacts 11 of the corresponding operated stations relay to the winding of intercept-control relay 18F16, operating it.

IIIK6. *Intercepting*

As above described for line or station intercept, intercept-control relay 18F16 is operated from ground supplied through any one of the contacts 1 to 4 of any one of the number-transfer relays assigned for intercept purposes, relay 18F16 being adjusted to operate from a high resistance ground such as ground through resistors 1895. Contacts on relay 18F16 operate call-in relay 18D30, which, as described in the noted former application, operates relays 18D3 and 18D4 to cancel the normal fixed translation and provides an overriding translation to direct the intercepted call to the intercept operator over an idle one of three intercept trunks selected by group allotter relays 18D5, 18D6 or 18D7.

IIIK7. *Clearing out*

When the connection has been completed to the intercept trunk, all operated relays in the translator clear out by the removal of ground from the digit wires as previously described.

IIIK8. *Number-transfer and line-intercept service for the same line*

Line-transfer service and line-intercept service may both be applied to the same line, as when a transferred multistation line has been provided with number-transfer service to avoid a directory change, following which a station is disconnected from the transferred line. Thereupon, the directory number of the disconnected station is jumpered for intercept service as described. In that event, when the concerned line number is called, a number-transfer relay assigned for line-transfer service and the number-transfer relay assigned for intercept service both operate on detecting the called number.

If a working station on the line is called, intercept call-in relay 18D30 does not operate and the operation of the relay assigned for line-transfer service is effective to cause overriding translation to direct the call to its transferred line location. But, if the noted disconnected station is called, call-in relay 18D30 is operated as previously described, thereby operating reset relay 18D4, along with reset relay 18D3 to transfer the overriding P, F, and U ground from wires 1804 of the number-transfer relays to wires 1805 of the group allotter. The overriding line-transfer translation is thereby set aside in favor of the required intercept translation.

IIIL. *Individual control twenty-station service*

As previously pointed out, block translator 1800 is arranged to provide group control twenty-station service which provides five twenty-station lines in any primary switch on line-link frame A by converting the fives lines in the fourth fives group to twenty-station service by transferring the five lines in the fifth fives group to respective lines in the fourth fives group.

The block translator 1800 is also arranged to provide individual control twenty-station service. This permits any line in the 1000 line-block to be converted to twenty-station service by transferring another line to serve as the second ten stations.

IIIL1. *Relay assignment*

When individual control twenty-station service is required, an available one of the forty transfer relays 18E1 to 18F10 is assigned for this purpose. A two-wire line-detecting jumper such as 1972, a three-wire reset jumper such as 1971, and a one-wire service jumper such as 1973 are installed as illustrated for twenty-first number-transfer relay 18E21.

IIIL1*a*. *Detector jumper 1972*

If, for example, twenty-station service is to be provided for line 460, and line 512 is available for use as a twenty-station line, line 512 is transferred to line 460 to serve as the last ten stations thereon. Number-transfer relay 18E21, if available, may be assigned for individual control twenty-station service.

The pin-terminal location for number-transfer relay 18E21 lies in the common field, section 1905, column 1, levels 6 through 12. The pins in the first column of levels 11 and 12 (opposite D1 and D2) are the detector terminals. A two-wire detector jumper 1972 (similar to jumper 1942) is run from these pins to the terminal pins in the detector field representing line No. 512.

IIIL1*b*. *Service jumper 1973*

As illustrated, jumper 1973 is connected between the RS terminal associated with number-transfer 18E21 and the Line-Transfer #2 bus bar (level 21 of section 1904). As previously described, Line-Transfer #2 bus bar is connected to battery through the winding of second-group relay 18F13 by way of conductor LT–2 in group CF11.

IIIL1*c*. *Reset jumper 1971*

If line 512 is to be assigned to line 460 to make up a twenty-station line, the directory number of line 512 is detected and by overriding translation is transferred to line 460 (B931) by running a three-wire reset jumper such as 1971 from the P, F, and U pin terminals (levels 6 to 8, column 1 of section 1905) to the reset P, F, and U levels in the reset field representing the translated equivalent of line 460.

IIIL2. *Detecting*

With the noted jumpers 1971, 1972, and 1973 installed for the twenty-first number-transfer relay 18E21, the consequent registration of the hundreds, tens, and units digits 5, 1, and 2, respectively, in the translator energizes number-transfer relay 18E21, as explained for the operation of number-transfer relay 18E1.

IIIL3. *Resetting*

Relay 18E21, at its contacts 1 to 3 connect the associated P, F, and U wires in group CF10 to the corresponding wires in group 1804, through which overriding translation is controlled. Contacts 4 of number-transfer 18E21 place ground on wire RS which is extended to the winding of second-group relay 18F15 through jumper 1973 in the pin-terminal section.

Second-group relay 18F15 operates and at its contacts 1 and 2 place ground on the windings of reset relay 18D3 and relay 18D2 operating them.

As previously described, the operation of reset relay 18D3 cancels the normal fixed translation and grounds the overriding translation common wires P, F, and U in group 1804. Reset ground is thereby extended through contacts 1 to 3 of the operated number-transfer relay, over wires P, F, and U in group CF10 and the connected terminal pins P, F, and U in the common field, to respective conductors in the three-wire reset jumper 1971. The ground on these jumpers is thereby extended to a primary wire, a fives wire, and a units wire in the reset field which corresponds to the overriding translation (B931) which is substituted for the normal fixed translation.

Contacts 7 of reset relay 18D3 open the operate path of relay 18D1 in order to completely cancel the normal fixed line translation and the fixed fives translation. The operation of relay 18D2 normally controls the normal fixed fives translation by receiving ground through break contacts of reset relay 18D3. Since relay 18D3 is operated on individual control twenty-station service, the normal fixed fives translation is cancelled.

If the block coupler 500 is arranged for twenty-station harmonic-ringing, the operation of relay 18D2, responsive to the operation of second-group relay 18F13, at its contacts 4 and 5 place ground on code-control wire CC and transfer ground on wire RR1 to RR2 (jumper A is installed as shown in Fig. 5, Part 1). On a harmonic-ringing coupler, wire CC is disconnected and contacts 3 are ineffective. With relay 18D2 operated, its contacts 5 place ground on wire RR–2 which will ground ring-reverse wire RR if any stations relay corresponding to the station digits 0 to 4 is operated.

If the call is to a normal ten-station line, relay 18D2 is not operated, and ground from wire RR–1 appears on ring-reverse wire RR if any one of stations relays corresponding to the station digits 5 to 9 is operated.

If the concerned block coupler is a code-ringing coupler, jumper "A" is removed and jumper "B" is installed as shown in Fig. 5, Part 1. Contacts 4 of 18D2 place ground on code-control wire CC, which as described in the former application, signals the second group of stations on a twenty-station line by prefixing a short ring to the selected code ring. Contact 5 of relay 18D2 has no effect at this time as jumper B disables its armature 5. Consequently, wire RR–1 is constantly grounded and ring-reverse wire RR extending to the concerned code ringing block coupler is controlled solely by the operated stations relay Fig. 5, Part 7 as previously described in the noted former application.

With the operation of the second-group relay 18F15 to condition the block coupler as described, and the operation of the number-transfer relay 18E21 to substitute overriding translation for the normal fixed translation, all calls to line 512 will be transferred to line 460 and the second group of stations on that line will be signalled.

IIIL4. *Making up three or four twenty-station lines*

As previously pointed out, group control twenty-station service, when applied, transfers five lines for twenty-station service by means of jumpers such as 1960, and individual control twenty-station service transfers a single line for twenty-station service by assigning a number-transfer relay for that service.

If a situation arises wherein only three or four lines are to be transferred for twenty-station service, three or four number-transfer relays may be assigned thereto for individual control twenty-station service. However, since the number-transfer relays are somewhat limited, this practice might seriously handicap the other special services.

By using the noted line-number transfer service and group control transfer service together, four lines may be assigned for twenty-station service and only one number-transfer relay need be used. For example, five lines may be transferred for twenty-station service by group control twenty-station service as previously described. The one line not available or not desired for twenty-station service is placed on line-number transfer with the reset jumpers of the number-transfer relay so connected that the overriding translation is the same as the fixed translation.

When the directory number of the line on both line-number transfer service and group control twenty-station service is dialed, both relays 18D3 and 18D1 operate. Contacts 7 of relay 18DC release relay 18D1, thereby cancelling the group control twenty-station service and allowing line-transfer service to take place. Since the reset jumpers of the number-transfer relay used, cause the overriding translation to be the same as the normal fixed translation, the call is completed normally.

It normally would not be advantageous to use both the above noted services in making up two twenty-station lines as three number-transfer relay would be required for line-transfer service while two number-transfer relays would be used on individual control twenty-station service.

IIIM. *Station-number transfer service for a twenty-station line*

The block translator is arranged to provide overriding translation for performing station-number transfer service for twenty-station lines. This service enables any station on any line to be moved to any station location in the second group of stations on any twenty-station line and yet retain the original director number.

IIIM1. *Relay assignment*

When station-number transfer service for twenty-station lines is to be applied to any station transferred to the second group of stations on a twenty-station line, an available one of the forty-number transfer relays 18E1 to 18F10 is assigned to the transferred station. A two-wire line-detecting jumper such as 1992, a three-wire reset jumper such as 1991, and two special service jumpers such as 1993 and 1994 are installed as illustrated in Fig. 6 for number-transfer relay 18F10, the fortieth relay of the number-transfer relays 18E1 to 18F10.

IIIM1*a*. *Detector jumper 1992*

If, for example, station 9 on line 687 is to be transferred to station location 2 in the second group of stations on line 460, number-transfer relay 18F10, if available, may be assigned for this transfer service.

The pin-terminal location for number-transfer relay 18F10 lies in the common field, section 1905, column 10 of levels 14 through 20. The pins in the tenth column of levels 14 and 15 (opposite D1 and D2) are the detector terminals for this particular relay. A two-wire detector jumper such as 1992 (similar to jumper 1982) is run from these pins to the terminal pins in the detector field representing line No. 687 and station 9 on that line. With this two-wire detector jumper installed, the number-transfer relay assigned thereto operates subject to line No. 6879 being registered in the translator.

IIIM1*b*. *Reset jumper 1991*

A three-wire reset jumper 1991 (similar to jumper 1961) is connected between the P, F, and U pin terminals corresponding to number-transfer relay 18F10 and the P, F, and U terminal pins in the reset field corresponding to the translated equivalent of line 460 (B931) to provide the required overriding translation.

IIIM1*c*. *Service jumpers 1993 and 1994*

The terminal pin RS, located in level 19, column 10 of section 1905 is connected to any pin of the station-transfer No. 2 bus bar (level 21 of section 1906) by jumper 1993 to cause the operation of number-transfer relay 18F10 to effect station-transfer service. Another special service jumper 1994 is connected between terminal pin ST (level 20, column 10 of section 1906) and the bus bar in the stations reset field (levels 1 to 5, section 1905 and 1906) which corresponds to the digit representing the location of the transferred station on the new line. For instance, if the transferred station has the same location that it had on line 687, jumper 1994 is connected to bus bar ST9. If the transferred station has a station location represented by the station digit 2, jumper 1994 is connected to bus bar ST2, as shown.

IIIM2. *Detecting*

With the noted jumpers 1991, 1992, 1993, and 1994 installed for the fortieth number-transfer relay 18F10, the consequent registration of the directory number 6879 in the translator causes number-transfer relay 18F10 to operate, as previously described for relay 18F3.

IIIM3. *Resetting*

The operation of number-transfer relay 18F10 connects the associated P, F, and U wires in group CF10 as to the corresponding wires in group 1804, through which overriding translation is controlled. Contacts 4 of number-transfer relay 18F10 place ground on wire RS which is extended over jumper 1993 and wire STT–2 in group CF11 to battery through the winding of second-group relay 18F15 and start relay 18F14. Start relay 18F14 and second-group relay 18F15 operate from the noted ground at contacts 4 of relay 18F10. Contacts 2 of relay 18F15 place ground on the winding of relay 18D2 operating it and its contacts 1, place ground on the winding of reset relay 18D3 operating it.

As previously described, operation of reset relay 18D3 cancels the normal fixed translation and grounds the overriding translation common wires P, F, and U in group 1804. Reset ground is thereby extended to a primary wire, a fives wire, and a units wire in the reset field which corresponds to the translated equivalent (B931) of the line (460) formed into a twenty-station line. Relay 18D2 conditions the concerned block coupler to provide the correct ringing signal for the second group of stations on the called line, as previously described for twenty-station service.

Start relay 18F14 causes the station register in the concerned block coupler to be reset as described for station-transfer service and contacts 5 of number-transfer relay 18F10 controls the operation of stop relay 18F13 as previously described.

The called station 9 on line 687 detected by jumper 1992 is now transferred to its new station location 2 in the second group of stations on line 460.

If a station on a ten-station line is to be transferred to its same station location on a twenty-station line, it is not necessary to reset the stations register as above explained. A two-wire detecting jumper such as 1992, a three-wire reset jumper such as 1991 are installed as shown for the fortieth number-transfer relay. Special service jumper 1994 is omitted as its control is limited to the resetting of the stations register which is not required when the new station location is the same as the original station location. Special service jumper 1993, instead of being connected to the stations-transfer #2 bus bar is connected to the line-transfer #2 bus bar. Registration of the directory number of the station to be transferred results in the operation of the associated number-transfer relay to transfer the call to its new location on a twenty-station line by operation of relays 18D2 and 18D3 as previously described, and to place ground on the RS punching to operate the second-group relay independent of the stations-register-reset start relay 18F14. The operation of the second-group relay, together with the operation of the reset relay 18D3 and the fives relay 18D2, independent of the operation of start relay 18F14, conditions the concerned block coupler to signal the station in the second group. The station being transferred to the twenty-station line is now transferred without resetting the stations register. Since the station digit dialed is the desired station, the original setting of the stations register causes the concerned block coupler to signal the proper station.

If a station is to be transferred from a twenty-station line to the same station location on another twenty-station line, the original directory number of the station to be transferred is detected in the normal manner. The transferring operation is as previously described for station-transfer on a twenty-station line. If a station on a twenty-station line is to be transferred to the same location on a ten-station line, the directory number of the station to be transferred is detected and the transfer operation is as explained under normal station-transfer.

I claim:

1. In an automatic telephone system serving lines including multi-station lines, there being multi-digit telephone numbers assigned respectively to the stations on said lines, each station on a multi-station line occupying a separate station position thereon, each said telephone number indexing the line on which the concerned station is located and indexing the station location of such station on the line, switching apparatus and means rendering it normally responsive to the calling of any said telephone number to extend a connection to the indexed line and to signal the station at the indexed station location thereon, station-transfer translating apparatus including a group of transfer relays, first means for adapting the transfer relays to correspond respectively to any desired ones of the telephone numbers and consequently to the individual stations respectively indexed thereby, second means for adapting the transfer relays respectively to any desired ones of the lines, means for operating any transfer relay responsive to the calling of the telephone number to which it is adapted to correspond by the said first means, and means in the translating apparatus responsive to the operation of the last said relay for preventing the switching apparatus from extending the connection to the line indexed by the called telephone number and for causing the switching apparatus to extend the concerned connection to the line to which the operated transfer relay has been adapted by the said second means, whereby stations which have been shifted to respective new lines may be reached thereon by the calling of the same respective telephone numbers as before they were shifted.

2. In an automatic telephone system according to claim 1, the translating apparatus including third means for adaptaing any of the said relays to any desired station location on the line to which the corresponding station may have been shifted, and means responsive to the operation of any last said relay for altering the signalling operation of the switching apparatus to signal the called station at the station location to which the last said relay has been adapted.

3. In an automatic telephone system as set forth in claim 2, at least one said line serving a first group and a second group of stations, each station of the second group being indexed according to its station group and the station location in the group, said switching apparatus normally responding to signal the called station as a station in the first group of stations, said translating apparatus including further adjustable means for altering the signalling operation of said switching apparatus to cause it to signal the called station as a station of the second group when the concerned predetermined station has been shifted to occupy a station position in the second group on the line to which it has been shifted.

4. In an automatic telephone system serving lines including multi-station lines, there being multi-digit telephone numbers assigned respectively to the stations on said lines, each station on a multi-station line occupying a separate station position thereon, each said telephone number indexing the line on which the concerned station is located and indexing the station location of such station on the line, switching apparatus and means rendering it normally responsive to the calling of any said telephone number to extend a connection to the indexed line and to signal the station at the indexed station location thereon, station-transfer translating apparatus and means rendering it responsive dependent upon the calling of the telephone number of any predetermined station on a multi-station line, said translating apparatus including (1) means for preventing the switching apparatus from signalling the station at the indexed station location, (2) means for selecting any desired new station location, and (3) means for causing the switching apparatus to signal the station at the selected new location, whereby the signalling operation of said switching apparatus is so altered as to cause it to signal the said called predetermined station at any station location on the called line to which such station may have been shifted.

5. In an automatic telephone switching system, lines having respective line numbers, certain of said lines each having stations thereon occupying respective separately numbered station positions, each station having a telephone number including the number of the concerned line and the number of the concerned station thereon, line-number registering means operable to register the number of any called line, station-number registering means operable to register the number of any called station on the called line, switching apparatus and means rendering it normally controllable by said line-number and station-number registering means to extend a connection to the called line and to signal the called station according to its station location on the called line, translating apparatus and means rendering it responsive dependent upon the calling of the telephone number of any predetermined station on any line, said translating apparatus including means for altering the response of the said switching apparatus to cause it to extend the concerned connection to any said line to which the called predetermined station may have been shifted, and means included in the last said means for restoring the said station-number registering means and for reoperating it to register the station location occupied on the last said line by the shifted station, said switching apparatus signalling the called station according to the newly registered station location.

6. In an automatic telephone switching system, lines having respective line numbers, certain of said lines each having stations thereon occupying respective separately numbered station positions, each station having a telephone number including the number of the concerned line and the number of the concerned station thereon, line-number registering means operable to register the number of any called line, station-number registering means operable to register the number of any called station on the called line, switching apparatus and means rendering it normally controllable by said line-number and station-number registering means to extend a connection to the called line and to signal the called station according to its station location on the called line, means for predetermining any station on any said line for station-transfer service, further means for predetermining any said line and any station location thereon to receive calls made to the said predetermined station, translating apparatus and means rendering it responsive dependent upon the calling of the telephone number of any said predetermined station, said translating apparatus including means for altering the response of the said switching apparatus to cause it to extend the concerned connection to the line predetermined for the predetermined station, and means included in the last said means for restoring the said station-number registering means and for reoperating it to register the predetermined station location on the last said line, said switching apparatus signalling the called station according to the newly registered station location.

7. In an automatic telephone system as set forth in claim 6, further means included in the said means for rendering the translating apparatus responsive, for rendering the switching apparatus incapable of completing the concerned connection until the station-number registering means has been restored and reoperated.

8. In an automatic telephone switching system, lines having respective line numbers, certain of said lines each having stations thereon occupying respective separately numbered station positions, each station having a telephone number including the number of the concerned line and the number of the concerned station thereon, line-number registering means operable to register the number of any called line, station-number registering means operable step by step to reach any desired one of a number of positions corresponding respectively to the numbers of stations on a called line, switching apparatus and means rendering it normally controllable by said line-number and station-number registering means to extend a connection to the called line and to signal the called station according to its station position on the called line, means for predetermining any station on any said line for station-transfer service, further means for predetermining any station location to receive calls made to the said predetermined station, reset means and means rendering it responsive dependent upon the calling of the telephone number of said predetermined station, means in said reset means for restoring the said station-number registering means and for transmitting pulses for reoperating it step by step to reach its position corresponding to the said predetermined station location, means for terminating the said transmission of pulses responsive to the last said register-means reaching its position corresponding to the predetermined station position, said switching apparatus signalling the called station according to the reset position of the station-number registering means.

9. In a translator for use in a switching system, pairs of detector-relay windings, separate detector means for each said winding pair requiring concurrent energization of both windings for its operation, a first group of individual detector terminals and means for energizing any one of them according to a separate combined value of the hundreds and the tens digits in called numbers, a second group of individual detector terminals and means for energizing any one of them according to a separate combined value of the units and the stations digits in said called numbers, units bus bars and means for energizing them according to the value of the units digit in said called number, means for connecting one winding of any pair to any individual terminal in the first group and means for connecting the other winding thereof to any individual terminal in the second group to detect a four digit number, and means for alternatively connecting such other winding to any desired units bus bar to detect a three digit number.

10. In a translator for use in a switching system, including multi-station lines, with the stations on a line being signalled according to respectve stiation locations thereon, call numbers being assigned to the respective stations, each call number indexing the concerned line and station location thereon, means normally providing fixed translation responsive to the calling of call numbers to direct the extension of connections to the lines respectively indexed thereby, a group of control relays, means for operating any control relay responsive to the calling of any desired said call number, sets of circuit terminals energizable by the operation of said relays respectively, line reset terminals and station reset terminals, means enabling a first jumper to be extended from a portion of any said set of circuit terminals to desired ones of said line reset terminals, and enabling a second jumper to be extended from a further portion thereof to a desired station reset terminal, means including any said first jumper and connected line reset terminals, subject to the connected said set of circuit terminals being energized, for providing overriding translation effective to direct the concerned connection to a line of an identity depending upon the line reset terminals to which the concerned first jumper is connected, and means including any said second jumper and connected station reset terminal for providing station-location translation directing the signalling of a station at any desired station location on the concerned line.

11. In a translator for use in a switching system, including multi-station lines, with the stations on a line being signalled according to respective station locations thereon, call numbers being assigned to the respective stations, each call number indexing the concerned line and station location thereon, means normally providing fixed translation responsive to the calling of call numbers to direct the extension of connections to the lines respectively indexed thereby, a group of control relays, means for operating any control relay responsive to the calling of any desired said call number, sets of circuit terminals energizable by the operation of said relays respectively, reset terminals and first and second service terminals, means enabling a first jumper to be extended from a portion of any set of circuit terminals to desired ones of said reset terminals, and enabling a second jumper to be extended from a further portion thereof to either one of said service terminals, means including any said first jumper and connected reset terminals, subject to the connected said set of circuit terminals being energized, for providing overriding translation effective to direct the concerned connection to a line of an identity depending upon the reset terminals to which the concerned reset jumper is connected, and means including any said second jumper and either connected service terminal, subject to the connected said set of circuit terminals being energized, for rendering effective said means for providing overriding translation, and means including the last said jumper and the second service terminal for providing station-location translation directing the signalling of a station at any desired station location on the concerned line.

12. In a switching system, multi-station lines each having a normal line number assigned thereto and having a normal group of separately numbered stations thereon, there being call numbers assigned to the said stations, one portion of each call number comprising the normal line number of the concerned line, and a further portion comprising the number of the concerned station in the normal group thereon, switching apparatus, a translator responsive to the calling of any said call number for controlling the switching apparatus to extend a connection to the called line and for signalling the called station thereon, means in the translator for assigning a second line number, comprising the normal line number of any desired unused line, to any desired one of said multi-station lines to permit a second group of respectively corresponding stations to be placed thereon, the means for assigning including jumpers and terminals therefor, overriding means in said translator including relay apparatus and said jumpers, said overriding means including means responsive to the calling of any call number which includes a said assigned second line number for exercising an overriding control over the switching apparatus to extend the concerned connection to the line to which such second line number is assigned, the overriding means further including means for exercising an overriding control over the switching apparatus to signal the called station in the second group on the connected line, as distinct from the corresponding station in the normal group of stations thereon.

13. In a party-line telephone system including block couplers through which connections are extendable to respective called lines, each block coupler including a stations register operable step-by-step in accordance with the number of impulses in a called digit indicative of the station location of the called station on the called line, a controller, digit wires multipled between the block couplers and the controller, said digit wires corresponding respectively to the operated positions of any stations register, means for temporarily individualizing any block coupler with the controller following the said operation of the stations register thereof, means for making a first marking connection through the stations register of the last said block coupler to the digit wire corresponding to its current position, means in the controller for recording the number of the called station according to the one of the digit wires to which the first marking connection is made, means in the controller for restoring the stations register in the last said block coupler and for making a second marking connection to the one of said digit wires which corresponds to a desired new station location, means for transmitting an indefinite series of resetting impulses from the controller to reoperate the restored stations register step-by-step, said register thereby making said first marking connection to the said digit wires in succession, means responsive to the coincidence of the first and second marking connections to the same digit wire for terminating the said series of resetting impulses to leave the stations register reset in the desired new station location, switching apparatus controlled by said controller for extending a connection from the individualized block coupler to a desired called party-line and for terminating the individualization, and means for signalling the station on the called line which corresponds to the position currently occupied by the stations register of the last said block coupler.

14. In a party-line telephone system as set forth in claim 13, the said marking connections being such that the said coincidence of marking connections to the same digit wire thereby establishes a shunt path around the said means for transmitting resetting impulses, said shunt path being effective to prolong the instant impulse indefinitely to thereby terminate the resetting advance of the stations register, and stop-relay means and means for controlling it over said shunt path for ending the said indefinite series of impulses and for indicating the termination of the resetting operation.

15. In a party-line telephone system including block couplers through which connections are extendable to respective called lines, each block coupler including a stations-register operable in accordance with the station location of the called station on the called line, controller apparatus common to said block couplers, means for temporarily individualizing any block coupler with the controller apparatus, means in the controller apparatus for recording the number of the called line and station thereon, means in the controller for setting the stations register in the individualized block coupler according to the identity of the called station on the called line, means for extending a connection from the individualized block coupler to the called line and for terminating the said individualization, and means for signalling the station on the called line which corresponds to the setting of the stations register of the last said block coupler.

References Cited in the file of this patent

UNITED STATES PATENTS

| | | |
|---|---|---|
| 1,648,031 | Ruggles | Nov. 8, 1927 |
| 1,734,083 | Friendly | Nov. 5, 1929 |
| 1,744,696 | Friendly | Jan. 21, 1930 |
| 1,794,603 | Friendly | Mar. 3, 1931 |
| 2,201,573 | Carpenter | May 21, 1940 |
| 2,508,644 | Jones | May 23, 1950 |
| 2,524,774 | Deakin | Oct. 10, 1950 |
| 2,574,903 | Bellamy | Nov. 13, 1951 |